(12) United States Patent
Santoiemmo

(10) Patent No.: US 8,833,241 B2
(45) Date of Patent: Sep. 16, 2014

(54) SELECT SERVING AND FLAVORED SPARKLING BEVERAGE MAKER

(75) Inventor: Carl Santoiemmo, Highland Heights, OH (US)

(73) Assignee: Primo Products, LLC, Winston-Salem, NC (US)

( * ) Notice: Subject to any disclaimer, the term of this patent is extended or adjusted under 35 U.S.C. 154(b) by 0 days.

(21) Appl. No.: 13/345,159

(22) Filed: Jan. 6, 2012

(65) Prior Publication Data

US 2012/0107463 A1    May 3, 2012

Related U.S. Application Data

(63) Continuation of application No. 12/874,488, filed on Sep. 2, 2010, now abandoned, which is a continuation-in-part of application No. 12/573,507, filed on Oct. 5, 2009, which is a continuation-in-part of application No. 12/594,678, filed as application No. PCT/US2008/062653 on May 5, 2008, now Pat. No. 8,250,972.

(60) Provisional application No. 60/927,329, filed on May 4, 2007.

(51) Int. Cl.
| | | |
|---|---|---|
| *A47J 31/40* | (2006.01) | |
| *A23L 2/56* | (2006.01) | |
| *A23L 2/54* | (2006.01) | |
| *B01F 15/00* | (2006.01) | |
| *B01F 3/04* | (2006.01) | |
| *B01F 15/02* | (2006.01) | |

(52) U.S. Cl.
CPC ............. *B01F 3/04808* (2013.01); *A23L 2/56* (2013.01); *A23L 2/54* (2013.01); *B01F 15/0035* (2013.01); *B01F 15/0212* (2013.01)
USPC ............. 99/323.2; 99/323.1; 99/290; 99/295; 426/232

(58) Field of Classification Search
CPC .................................................. B01F 3/04808
USPC ............. 99/323.1, 323.2, 275, 279, 284, 290, 99/295; 261/72.1, 74, 115, DIG. 7; 426/232
See application file for complete search history.

(56) References Cited

U.S. PATENT DOCUMENTS

| | | | |
|---|---|---|---|
| 3,596,588 A | | 8/1971 | Moss |
| 3,628,444 A | * | 12/1971 | Mazza ............................ 99/275 |

(Continued)

FOREIGN PATENT DOCUMENTS

| | | |
|---|---|---|
| DE | 10 2007 014 386 A1 | 10/2008 |
| WO | WO 2005/060801 A1 | 7/2005 |

(Continued)

OTHER PUBLICATIONS

International Seach Report and Written Opinion for International Application No. PCT/US2008/062653, mailed Aug. 14, 2008.

(Continued)

*Primary Examiner* — Dana Ross
*Assistant Examiner* — James Sims, III
(74) *Attorney, Agent, or Firm* — Alston & Bird LLP

(57) ABSTRACT

A beverage maker for making single serving customized beverages is provided herein. The beverage maker provides on-demand, single dose sparkling or non-sparkling flavored waters, juices or sodas. An example beverage maker includes a reservoir in fluid communication with a carbonation chamber for mixing a selected volume of fluid with carbon dioxide. The beverage maker also includes a pressurized carbon dioxide source in fluid communication with the carbonation chamber. The beverage maker is configured to receive an individually packed, single use disposable flavor cup containing a flavor and having a sealed cover that covers and seals the flavor cup. Additionally, the beverage maker includes a piercing mechanism for piercing the flavor cup and mixing the selected volume of fluid therein, and for discharging a blended fluid. The carbonation chamber comprises a pressure vessel assembly of a fixed volume such that carbon dioxide absorption can be performed and controlled.

33 Claims, 20 Drawing Sheets

(56) References Cited

U.S. PATENT DOCUMENTS

| | | |
|---|---|---|
| 4,136,202 A * | 1/1979 | Favre .................... 426/77 |
| 4,355,735 A | 10/1982 | Whorton, III et al. |
| 4,520,950 A | 6/1985 | Jeans |
| 4,793,513 A | 12/1988 | Verheijen |
| 4,815,366 A | 3/1989 | Hauslein |
| 4,836,414 A | 6/1989 | Credle, Jr. et al. |
| 4,919,041 A | 4/1990 | Miller |
| 4,944,217 A | 7/1990 | Watanabe |
| 4,960,261 A * | 10/1990 | Scott et al. .................... 251/148 |
| 5,008,013 A | 4/1991 | Favre et al. |
| 5,063,836 A | 11/1991 | Patel |
| 5,071,594 A | 12/1991 | Borland et al. |
| 5,071,595 A | 12/1991 | Burrows |
| 5,111,740 A | 5/1992 | Klein |
| 5,118,010 A * | 6/1992 | Jeans ................... 222/3 |
| 5,124,088 A * | 6/1992 | Stumphauzer ........... 261/121.1 |
| 5,188,019 A | 2/1993 | Vahabpour |
| 5,195,422 A | 3/1993 | Newnan |
| 5,260,081 A | 11/1993 | Stumphauzer et al. |
| 5,285,718 A | 2/1994 | Webster et al. |
| 5,295,611 A | 3/1994 | Simard |
| 5,325,765 A | 7/1994 | Sylvan et al. |
| 5,460,846 A | 10/1995 | Stumphauzer et al. |
| 5,794,519 A | 8/1998 | Fischer |
| 5,840,189 A * | 11/1998 | Sylvan et al. ............ 210/474 |
| 5,870,944 A * | 2/1999 | Vander Zalm et al. ...... 99/323.2 |
| 5,875,703 A | 3/1999 | Rolfes |
| D408,679 S | 4/1999 | Potts et al. |
| 5,901,635 A | 5/1999 | Lucas et al. |
| 5,918,768 A | 7/1999 | Ford |
| 5,975,365 A | 11/1999 | Hsieh |
| 6,068,875 A | 5/2000 | Miller et al. |
| 6,079,315 A | 6/2000 | Beaulieu et al. |
| 6,082,247 A | 7/2000 | Beaulicu |
| 6,142,063 A | 11/2000 | Beaulieu et al. |
| 6,182,554 B1 | 2/2001 | Beaulieu et al. |
| 6,305,267 B1 | 10/2001 | Rolfes |
| D452,433 S | 12/2001 | Lazaris |
| D452,434 S | 12/2001 | Sweeney |
| 6,370,884 B1 | 4/2002 | Kelada |
| D461,358 S | 8/2002 | Cahen |
| 6,440,256 B1 | 8/2002 | Gordon et al. |
| D462,865 S | 9/2002 | Honan et al. |
| D474,110 S | 5/2003 | Sweeney |
| D474,111 S | 5/2003 | Lazaris |
| 6,589,577 B2 | 7/2003 | Lazaris et al. |
| 6,606,938 B2 | 8/2003 | Taylor |
| 6,607,762 B2 | 8/2003 | Lazaris et al. |
| 6,645,537 B2 | 11/2003 | Sweeney et al. |
| 6,655,260 B2 | 12/2003 | Lazaris et al. |
| 6,658,989 B2 | 12/2003 | Sweeney et al. |
| 6,666,130 B2 | 12/2003 | Taylor et al. |
| 6,672,200 B2 | 1/2004 | Duffy et al. |
| 6,698,332 B2 | 3/2004 | Kollep et al. |
| 6,708,600 B2 | 3/2004 | Winkler et al. |
| 6,712,342 B2 | 3/2004 | Bosko |
| D489,215 S | 5/2004 | Honan et al. |
| 6,742,772 B2 | 6/2004 | Kiefer |
| 6,752,069 B1 | 6/2004 | Burke et al. |
| D492,878 S | 7/2004 | Nakato et al. |
| 6,820,535 B2 | 11/2004 | Fischer |
| 6,843,164 B2 | 1/2005 | Drobeck |
| 6,857,353 B2 | 2/2005 | Kollep et al. |
| D502,362 S | 3/2005 | Lazaris et al. |
| 6,941,856 B2 | 9/2005 | Font et al. |
| 6,955,116 B2 | 10/2005 | Hale |
| 6,974,052 B1 | 12/2005 | d'Hond et al. |
| D513,572 S | 1/2006 | Schaffeld et al. |
| 6,990,391 B1 | 1/2006 | Cunha et al. |
| 7,017,735 B2 | 3/2006 | Carlson |
| 7,021,197 B2 | 4/2006 | Chen et al. |
| 7,126,479 B2 | 10/2006 | Claessens et al. |
| 7,165,488 B2 | 1/2007 | Bragg et al. |
| D544,299 S | 6/2007 | Schaffeld et al. |
| D559,611 S | 1/2008 | Cheong |
| 7,331,483 B2 | 2/2008 | Bhimani et al. |
| 7,347,138 B2 | 3/2008 | Bragg et al. |
| 7,360,418 B2 | 4/2008 | Pelovitz |
| 7,377,162 B2 | 5/2008 | Lazaris |
| D570,637 S | 6/2008 | Glucksman et al. |
| 7,398,726 B2 | 7/2008 | Streeter et al. |
| D582,714 S | 12/2008 | Hensel |
| 7,472,643 B2 | 1/2009 | Mitchell et al. |
| 7,513,192 B2 | 4/2009 | Sullivan et al. |
| 7,523,695 B2 | 4/2009 | Streeter et al. |
| 7,552,672 B2 | 6/2009 | Schmed |
| D597,366 S | 8/2009 | Drake et al. |
| D604,985 S | 12/2009 | Taylor et al. |
| D607,258 S | 1/2010 | De Pra' |
| D607,259 S | 1/2010 | De Pra' |
| 7,640,845 B2 | 1/2010 | Woodnorth et al. |
| 7,677,158 B2 | 3/2010 | McDuffie et al. |
| D622,999 S | 9/2010 | Murauyou et al. |
| 7,798,054 B2 | 9/2010 | Evers et al. |
| D626,368 S | 11/2010 | De Pra' |
| D630,881 S | 1/2011 | Rezzonico |
| D634,963 S | 3/2011 | Romandy |
| 8,033,211 B2 | 10/2011 | Halliday et al. |
| 2004/0112222 A1 | 6/2004 | Fischer |
| 2004/0134357 A1 | 7/2004 | Cai |
| 2004/0250686 A1 * | 12/2004 | Hale ..................... 99/295 |
| 2005/0087255 A1 | 4/2005 | Humphrey et al. |
| 2005/0154447 A1 | 7/2005 | Goshgarian |
| 2005/0287251 A1 | 12/2005 | Lazaris et al. |
| 2006/0016347 A1 | 1/2006 | Girard et al. |
| 2006/0090653 A1 | 5/2006 | McDuffie et al. |
| 2006/0112831 A1 | 6/2006 | Greenwald et al. |
| 2006/0144244 A1 | 7/2006 | Girard et al. |
| 2006/0174773 A1 | 8/2006 | Taylor |
| 2006/0288776 A1 | 12/2006 | Pelovitz |
| 2006/0288777 A1 | 12/2006 | Lazaris |
| 2006/0292012 A1 | 12/2006 | Brudevold et al. |
| 2007/0056994 A1 | 3/2007 | Woodnorth et al. |
| 2007/0081367 A1 | 4/2007 | Hammond |
| 2007/0131711 A1 * | 6/2007 | Minard et al. ............. 222/105 |
| 2007/0175334 A1 | 8/2007 | Halliday et al. |
| 2007/0203587 A1 | 8/2007 | Erlandsson et al. |
| 2007/0215239 A1 | 9/2007 | Dorney |
| 2007/0221066 A1 | 9/2007 | Sullivan et al. |
| 2008/0095904 A1 | 4/2008 | Sullivan et al. |
| 2008/0115674 A1 | 5/2008 | Huang et al. |
| 2008/0116262 A1 * | 5/2008 | Majer .................. 235/381 |
| 2008/0134902 A1 | 6/2008 | Zimmerman et al. |
| 2008/0173705 A1 | 7/2008 | Girard et al. |
| 2010/0024658 A1 | 2/2010 | Jacobs et al. |
| 2010/0037779 A1 | 2/2010 | Pecci et al. |
| 2010/0107887 A1 | 5/2010 | Bentley et al. |
| 2010/0156614 A1 | 6/2010 | Adstedt et al. |
| 2010/0251901 A1 | 10/2010 | Santoiemmo |
| 2010/0303964 A1 | 12/2010 | Beaulieu et al. |
| 2010/0326283 A1 | 12/2010 | Evers et al. |

FOREIGN PATENT DOCUMENTS

| | | | |
|---|---|---|---|
| WO | WO 2005/079361 A2 | 9/2005 | |
| WO | WO 2008/124851 A1 | 10/2008 | |
| WO | WO 2010/064228 A1 | 6/2010 | |

OTHER PUBLICATIONS

Keurig B140 & 200 Single-Cup Brewers; Green Mountain Coffee Roasters; p/n 67159; Jul. 2007; B140-200; 2 pages.

Office Action for U.S. Appl. No. 12/594,678 dated Oct. 19, 2011.

Office Action for U.S. Appl. No. 12/573,507 dated Oct. 19, 2011

Notice of Allowance for U.S. Design Application No. 29/369,100 dated Jun. 9, 2011

Combined Search and Examination Report for Application No. GB 1115093.5 dated Dec. 23, 2011.

Office Action for United Kingdom Application No. GB 1115093.5; dated Dec. 20, 2012.

Office Action for German Application No. 10 2011 112 159.9 dated Jan. 17, 2013.

* cited by examiner

SELECT SERVING AND FLAVORED SPARKLING BEVERAGE MAKER

RELATED APPLICATIONS

The present invention is a Continuation of U.S. patent application Ser. No. 12/874,488, filed Sep. 2, 2010, entitled "Select Serving and Flavored Sparkling Beverage Maker," which was a Continuation in Part of U.S. patent application Ser. No. 12/573,507, filed on Oct. 5, 2009, entitled Select Serving and Flavored Sparkling Beverage Maker," which was a Continuation in Part of U.S. patent application Ser. No. 12/594,678, filed Oct. 5, 2009, entitled "Select Serving and Flavored Sparkling Beverage Maker," which was a national phase entry of International Application No. PCT/US08/62653, filed on May 5, 2008, entitled "Select Serving and Flavored Sparkling Beverage Maker," which claims priority to U.S. Provisional Patent Application No. 60/927,329, filed on May 4, 2007, entitled "Select Serving and Flavored Sparkling Beverage Maker," which are each incorporated by reference in their entireties.

BACKGROUND OF THE INVENTION

1. Field of the Invention

The present invention relates generally to method and a device to make a single or a multiple serving of a select flavored, carbonated or noncarbonated beverage and, more particularly, to an apparatus and method for providing an individual serving 'bottling plant' for creating such beverages.

2. Description of the Related Art

While coffee makers and hot beverage makers have existed for quite some time, a relatively new market development has been created for single serve beverage appliances. Such machines are all designed to quickly brew a single cup of coffee or tea at a time. In the United States, the most commercially and widely available of these is made by Keurig Company, in which the grounds are pre-manufactured into prepared, single-serving pod called K-Cups®. Once the machine has heated the water, the user inserts a K-Cup® into the machine, places a mug under the spout, and presses an actuation button to allow hot water to be then dispensed through the K-Cup®. The K-Cup® forms an internal brewing volume, and allows for sufficient mixing and steeping time to form a brewed beverage before being filtered there through into the mug. In this manner, a cup of coffee, tea or hot chocolate is prepared. By omitting the K-Cup®, users can also merely prepare a mug of hot water, which can then be dispensed for use in making hot cocoa, tea, instant soup, or other hot drinks directly within the mug.

Devices of similar end use exist by Flavia™ Beverage Systems (a division of Mars, Incorporate), Nesspresso™ (of Nestlé Nespresso S.A., an operating unit of the Nestlé Group), Senseo® coffee brewing system from Dutch companies Philips and Douwe Egberts, a subsidiary of Sara Lee Corporation), and the Tassimo™ Hot Beverage System (developed by Kraft Foods, Inc.), just to name a few.

To date, such single serve beverage appliances are targeted, and therefore limited, in their capabilities: hot beverages made by brewing, steeping or the like. Consequently, a need exists for an on-demand, in situ single dose cold beverage machine capable of creating sparkling or non-sparkling flavored waters, juices or sodas.

SUMMARY OF THE INVENTION

The problems associated with the making of on-demand, metered quantity of sparkling or non-sparkling flavored waters, juices or sodas are very much different than hose hurdles presented in the making of hot beverages made by brewing, steeping or the like. The teachings available from these commercially available hot beverage machines have been found to be very much non-analogous to the features and functions needed herein. Through significant trial and error, the present invention as disclosed herein teaches a single serving beverage maker that provides a means to select a flavor, to select an amount of flavor, to control a carbonation level, and to control the overall blend, ratio or type of beverage, such as, for example, a sparkling water, a sparkling soda, a sparkling juice, a non-sparkling energy drink, or the like.

While the prior art teaches that the use of a single serving 'dose' of coffee or tea provided in a fixed amount in a pod or small container can function as a mixing or steeping vessel, the present invention provides a means in which the beverage machine can control the blending and manufacturing process of the finished drink in a repeatable, consistent manner to achieve a designed end blend for a person; and to repeatedly and to consecutively make one of a number of such different single-serving beverages at home.

It is an object of the present invention to provide a means to make a single serving of a beverage within a user's home and on demand.

It is an further object of the present invention to be able to create beverages including flavored waters with vitamins/minerals, sport drinks, energy drinks, herbal teas or other carbonated or non-carbonated cold beverages in a manner that is individually customized.

It is another object of the present invention to provide a means to control the proportion of concentrate to diluent and total volume of the created beverage.

It is yet another object of the present invention to comprise a means to regulate and to control the pressure at which the beverage is carbonated.

It is still yet another object of the present invention to provide a means to regulate the level of carbonation.

It is a further object of the present invention to provide a means to regulate and the select the flavor of the sparkling beverage at the time the beverage is dispensed.

It is a final object of the present invention to provide all of the benefits the foregoing objects entail.

BRIEF DESCRIPTION OF THE DRAWINGS

The advantages and the features of the present invention will become better understood with reference to the following and the more detailed description and the claims taken in conjunction with the accompanying drawings, in which like elements are identified with like symbols, and in which:

FIG. 4 is a cross sectional side view of the pitcher assembly 18 taken along line IV-IV of FIG. 3a;

FIG. 5b is an exploded view of the carbonation assembly 50 of FIG. 5a;

DETAILED DESCRIPTION OF THE PREFERRED EMBODIMENTS

The best mode for carrying out the invention is presented in terms of its preferred embodiment as developed discoveries and improvements to those teachings described in the RELATED APPLICATIONS, incorporated by reference herein as if rewritten in their entirety, and herein depicted within the Figures.

1. General Description of the Device

Figure 1A:
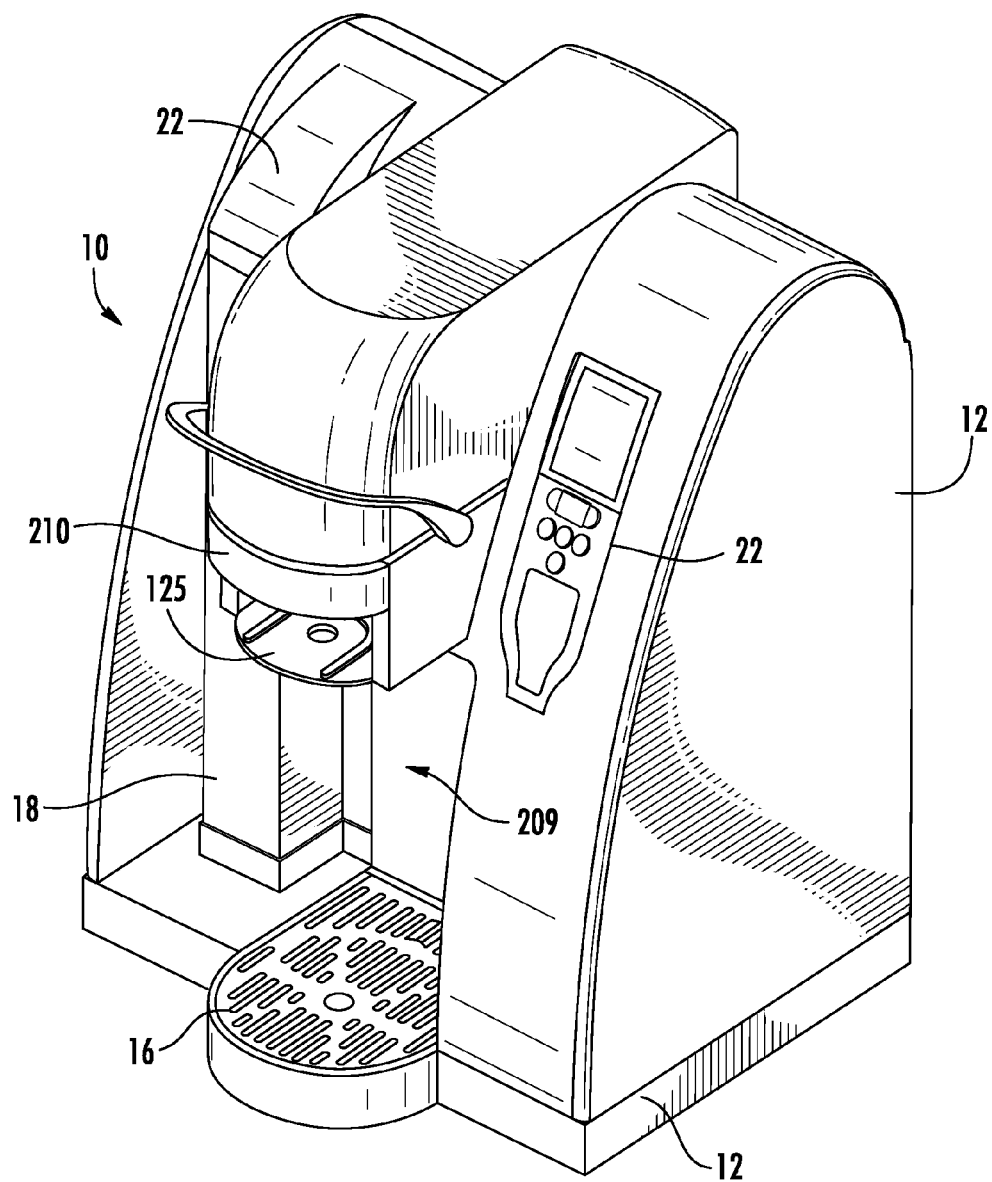
FIG. 1a is a front perspective view of an in-situ counter top beverage maker for carbonated and uncarbonated beverages according to the preferred embodiment of the present invention.
Figure 1B:
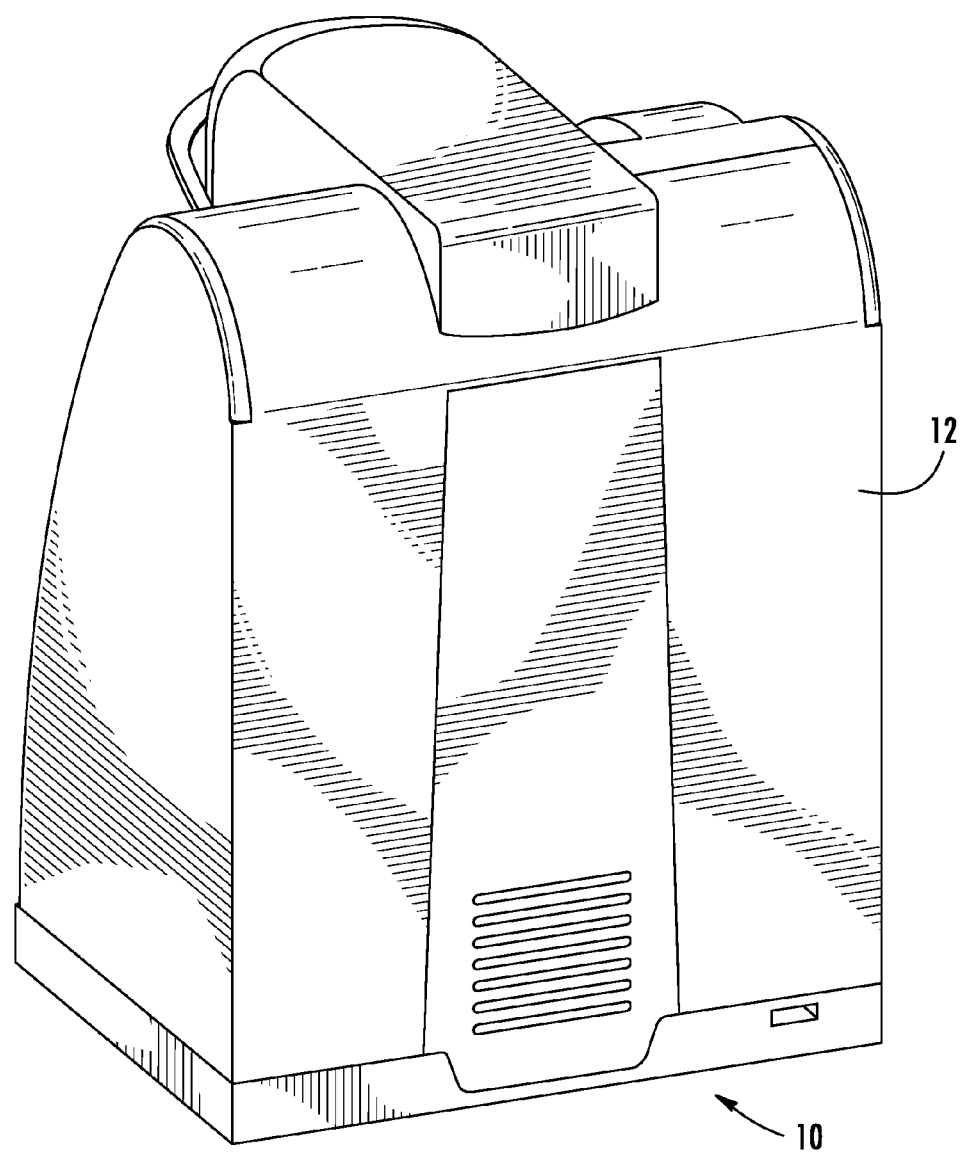
FIG. 1b is a rear perspective view thereof.

Referring now to FIG. 1a and FIG. 1b, a preferred embodiment of an in-situ counter top beverage maker for carbonated and uncarbonated beverages, hereinafter referred to generally as a cold beverage maker or beverage maker 10, is shown. An outer housing 12 covers and contains the modular internal systems, while providing an aesthetically pleasing industrial design. While many of the teachings and improvements of the present invention can be achieved without limitation to size or form factor, one additional key improvement taught by the present disclosure is to be able to provide a beverage maker 10 that can fit conveniently onto a standard kitchen counter top. As such, it is anticipated that the outer housing 12 would be capable of having an overall height of less than 15.5 inches, with a preferred outer dimension being within an overall cube of 15.5 inches high by 14 inches wide by 12.75 inches deep.

The housing 12 further supports a control area 22 forming an operational interface or user control interface, as described in greater detail below. A filling area, generally shown as 209 includes a piercing mechanism 210 (as described in greater detail below) which allows for mixing of chilled carbonated or noncarbonated water with a single portion flavor concentrate container above the base splash plate 16.

As shown, the housing 12 is affixed to a base 14, and provided with additional structural integrity and which further functions as an attachment member for connection of the various system components as will be described in greater detail below. A base splash plate 16 or overflow tray is further supported by the base 14 and is of a size, shape and location as to provide for collection of spilled or otherwise mis-dispensed fluids. According to the preferred embodiment presented herein, the overflow tray is adapted to collect up to 16 fluid ounces of liquid in that the present design has been selected for dispensing of either eight or sixteen ounce beverages, as will be described in greater detail below.

Figure 3A:
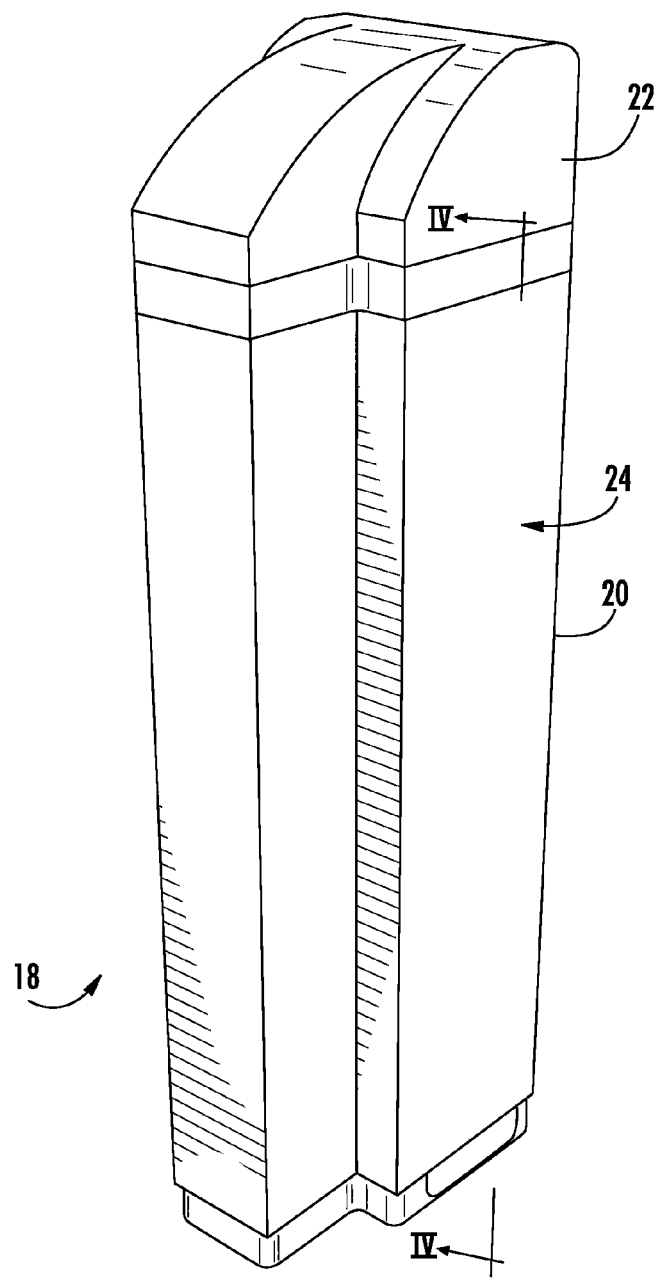
FIGS. 3a and 3b are front and rear perspective views, respectively, of a pitcher assembly 18 for use with the counter top beverage maker according to the preferred embodiment of the present invention.
Figure 3B:
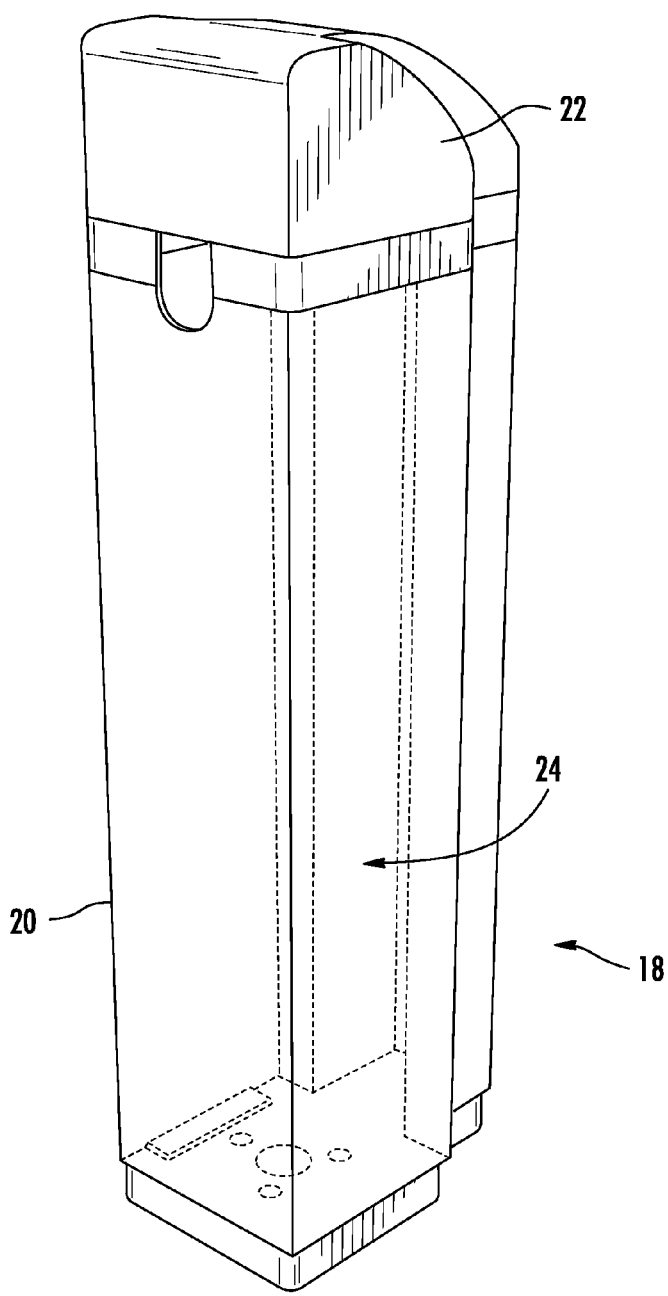
Figure 3C:
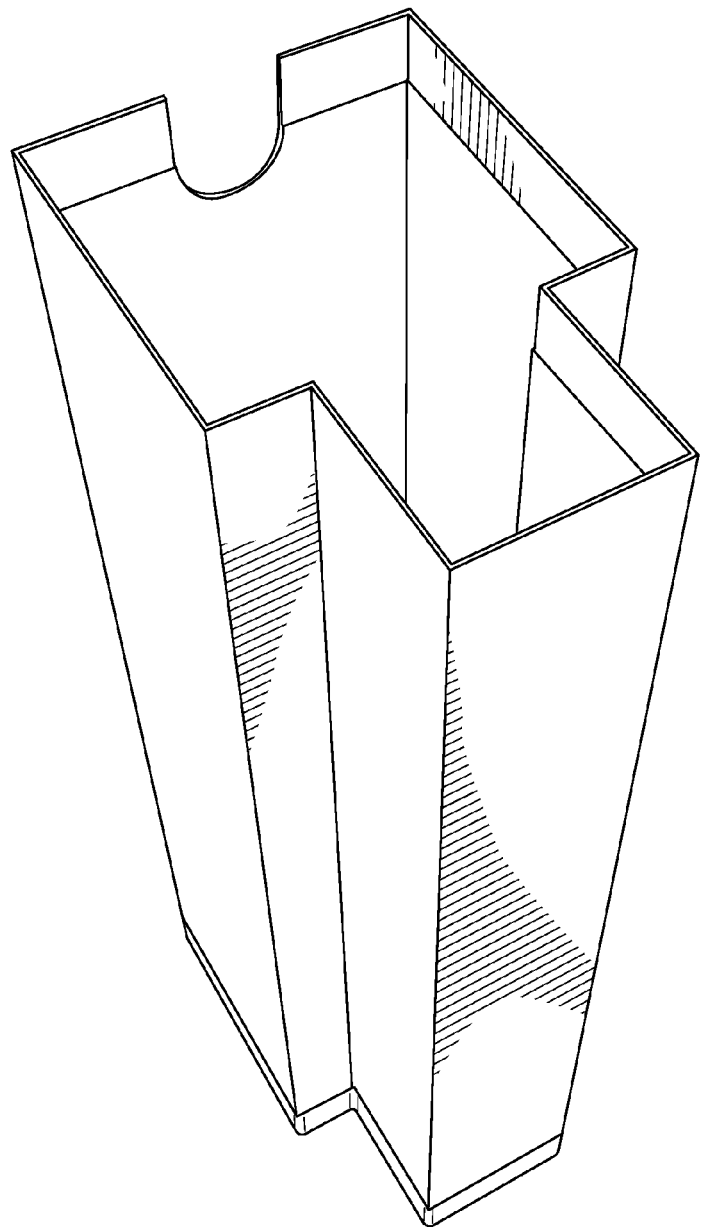
FIGS. 3c and 3d are upper and lower perspective views, respectively, of the pitcher body 20 for use as part of the pitcher assembly 18 as shown in FIGS. 3a and 3b.
Figure 3D:
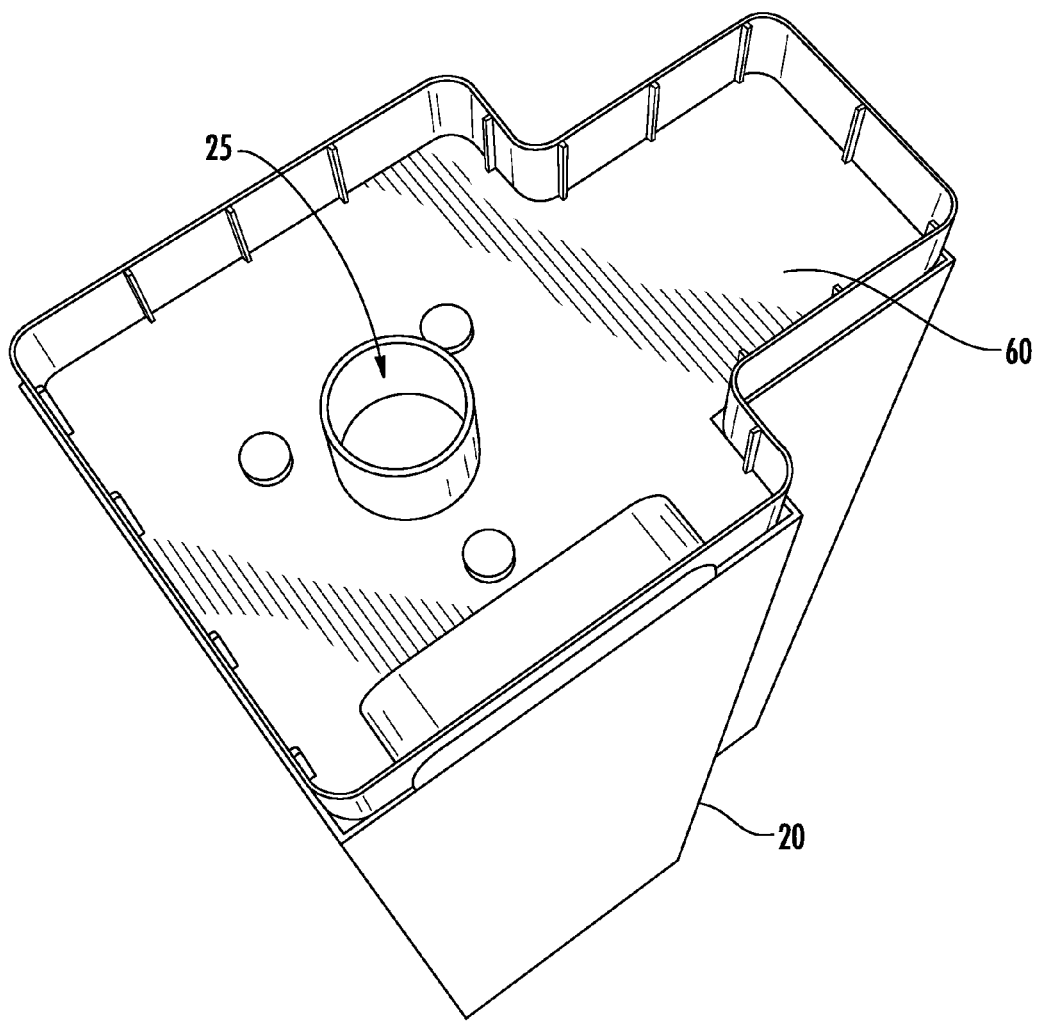
Figure 3E:
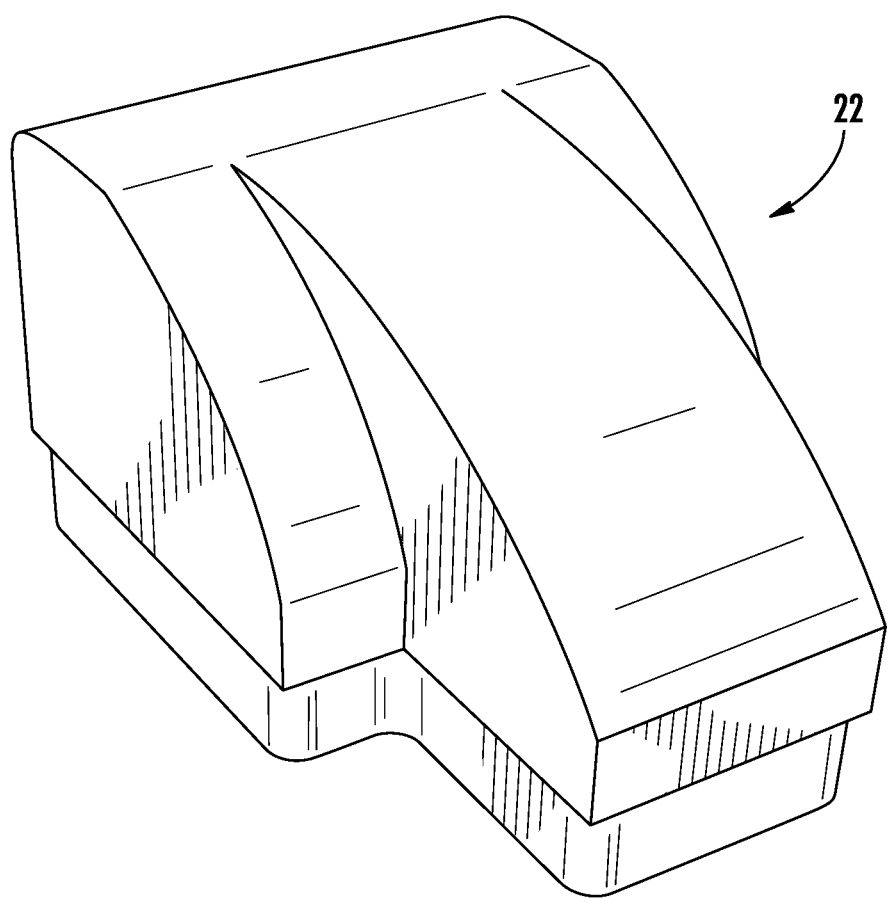
FIGS. 3e and 3f are upper and lower perspective views, respectively, of the pitcher lid 22 for use in conjunction with the pitcher body 20 and as part of the pitcher assembly 18.
Figure 3F:
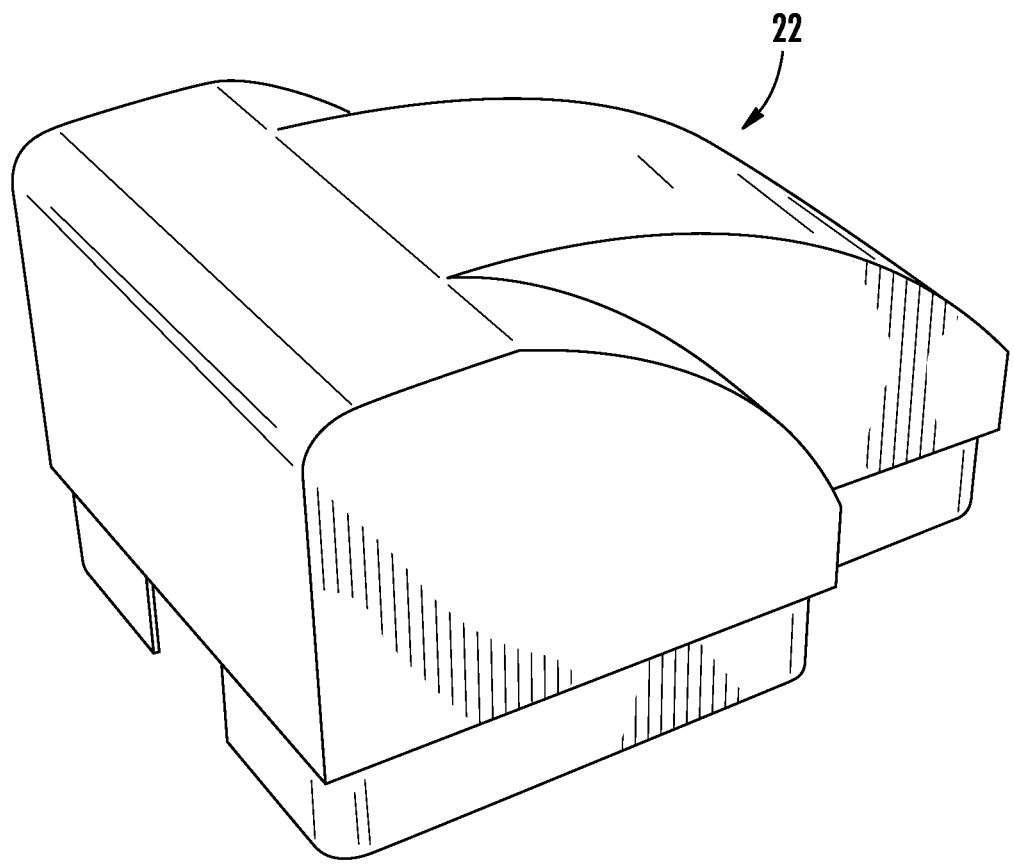
Figure 4:
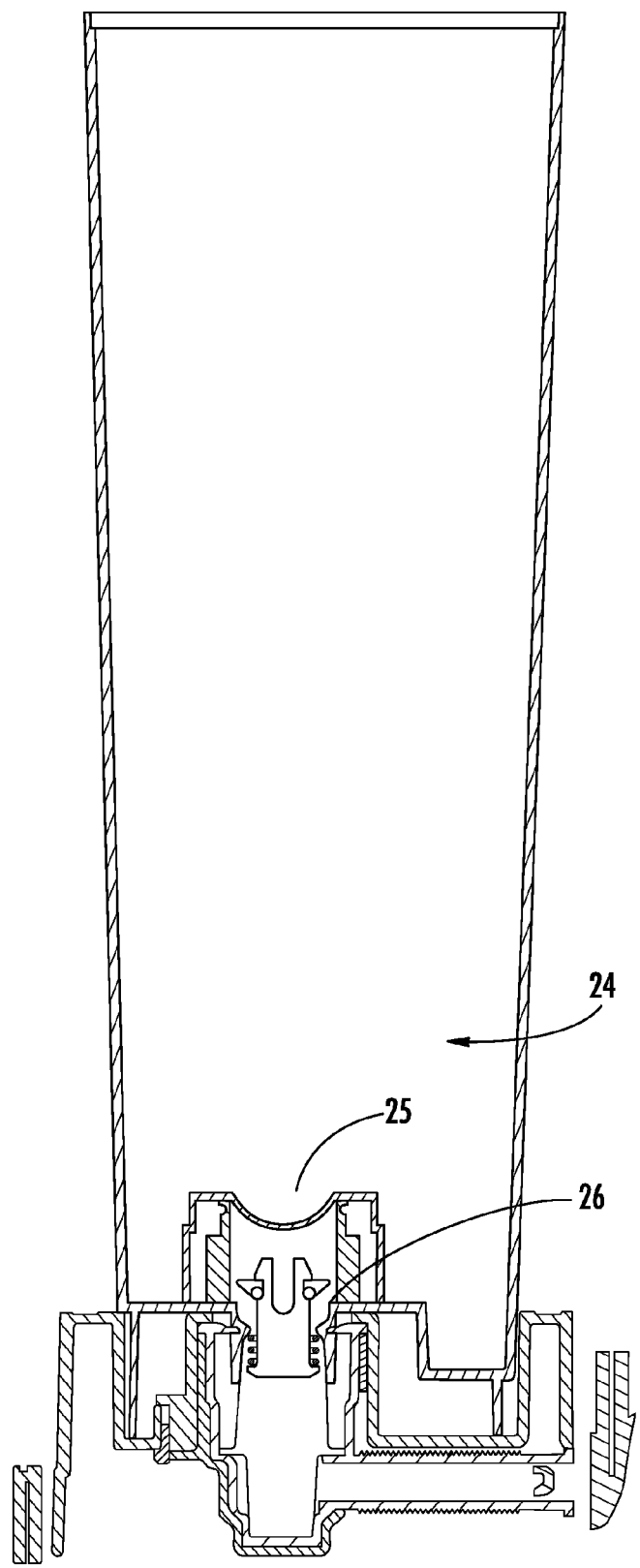

Beverage making fluid is anticipated as being substantially water. However, it would be obvious to a person having ordinary skill in the relevant art than any potable fluid capable of being used as a beverage could be utilized as an obvious equivalent (such as, for example, fruit or vegetable juices). Fluid is introduced to the beverage maker 10 through a pitcher assembly 18. The pitcher assembly 18 is best shown in conjunction with FIG. 3a through FIG. 4b, the pitcher assembly 18 comprise a pitcher body 20 forming a fluid reservoir 24 contained by a removable pitcher lid 22 capable of sealingly closing the mouth of the pitcher body 20. It is anticipated that the pitcher assembly 18 will be nestable within the base 14 but removable from the machine housing 12 such as to allow the assembly 18 to function as a beverage pitcher capable of being placed in a refrigerator (not shown) such as to chill any fluid contents. The pitcher body 20 forms a discharge orifice 25 formed in the bottom of the pitcher body 60 (best shown in FIG. 3d) which allows for fluid communication between the fluid reservoir 24 and a water pump 106 that further communicates with a carbonation chamber 80 as described in greater detail below. As shown in conjunction with FIGS. 4a and 4b, a spring urged pitcher valve assembly 26, provides a mechanism for opening the discharge orifice 25 upon nesting of the pitcher body 20 within the base 14, while allowing for automatic closure upon removal. In such a manner the user can remove the assembly 18, fill the body 20, and return the base 14 to provide delivery of the liquid contents to pre-prime the machine.

While the selection of any particular volume of water reservoir 20 would be a design choice to accommodate an individual performance requirement, shown in the present invention is a 64 fluid ounce water reservoir 20 formed as a blow molded volume. It is anticipated that a person having ordinary skill in the relevant art, in light of the teachings and goals of the present invention, would envision as an alternate design choice to incorporate a rigidly attached (i.e. non-removable) fluid reservoir mounted within or on the housing 12 and having access through a fluid fill door. It is anticipated that such a functionally equivalent design alternative would require a means of chilling the contents of such a reservoir, a means for insulating such a reservoir, or both.

The fluid provided from the pitcher assembly 18 is thereafter directed to be carbonated (optional), blended, and discharged to a drinking vessel as flavored water with vitamins/minerals, sport drink, energy drink, herbal tea or other carbonated or non-carbonated cold beverages in a manner that is individually customized. The present application incorporates the teachings and improvements developed from those inventions disclosed in the RELATED ART listed above, while disclosing additional improvements which shall be identified and described alone in specific detail. It will become obvious to a person having ordinary skill in the relevant art, in hindsight light of the teachings of the RELATED ART, that the specific details of these inventions described alone, can and ought to be understood in conjunction with the operation of the overall invention. With this in mind, the current invention can be broadly construed in terms of the following additional improvements: carbonation devices; carbonation methods; syrup (i.e. flavor or non-water liquid component) interaction or control; and, piercing mechanism.

2. Detailed Description of the Carbonation Devices

Figure 2:
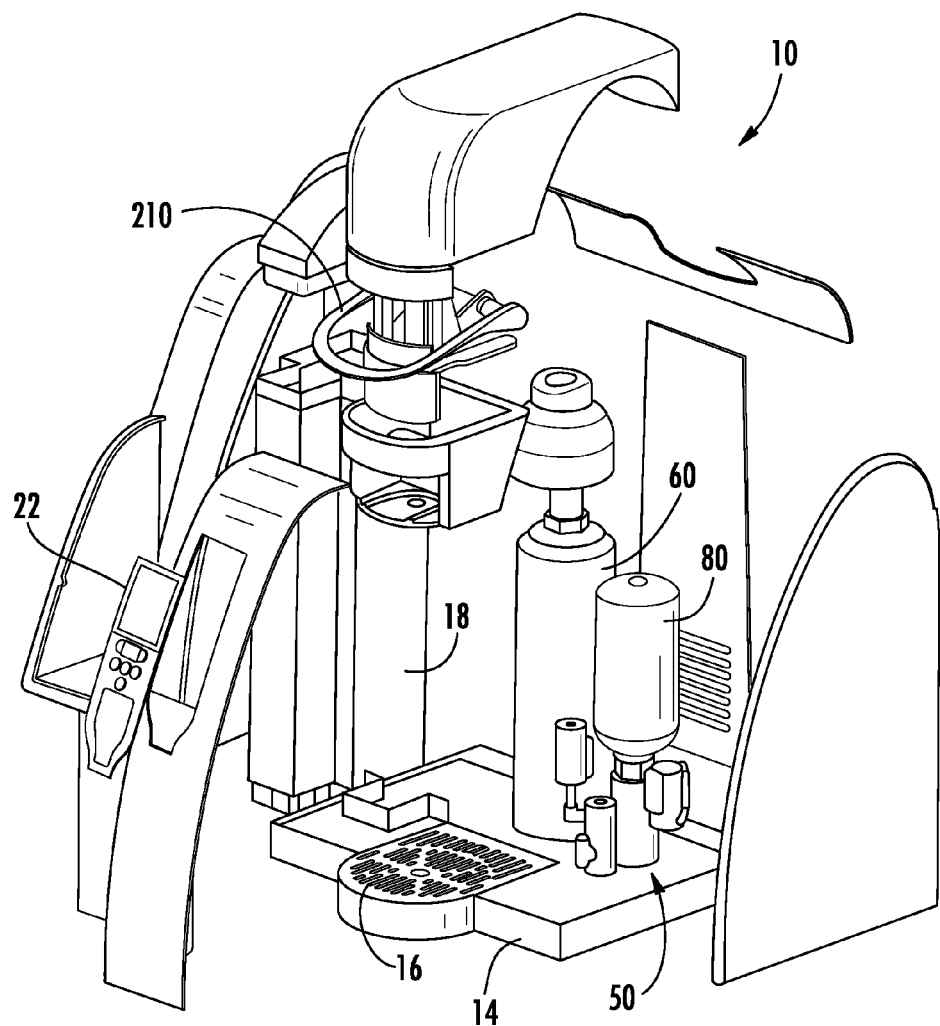
FIG. 2 is a partially exploded perspective view thereof.
Figure 5A:
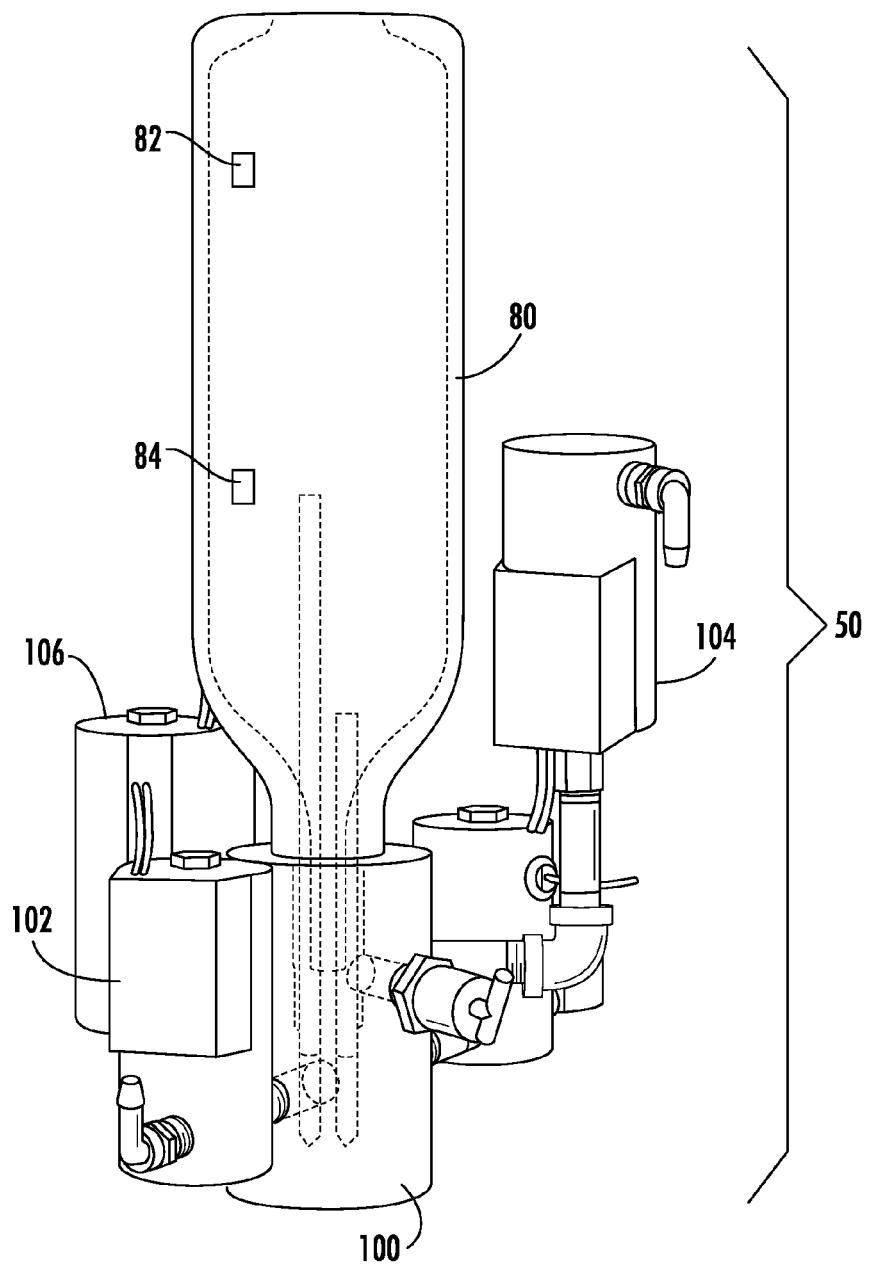
FIG. 5a is a perspective view of a carbonation assembly 50 for use with the counter top beverage maker 10 according to the preferred embodiment of the present invention.
Figure 5B:
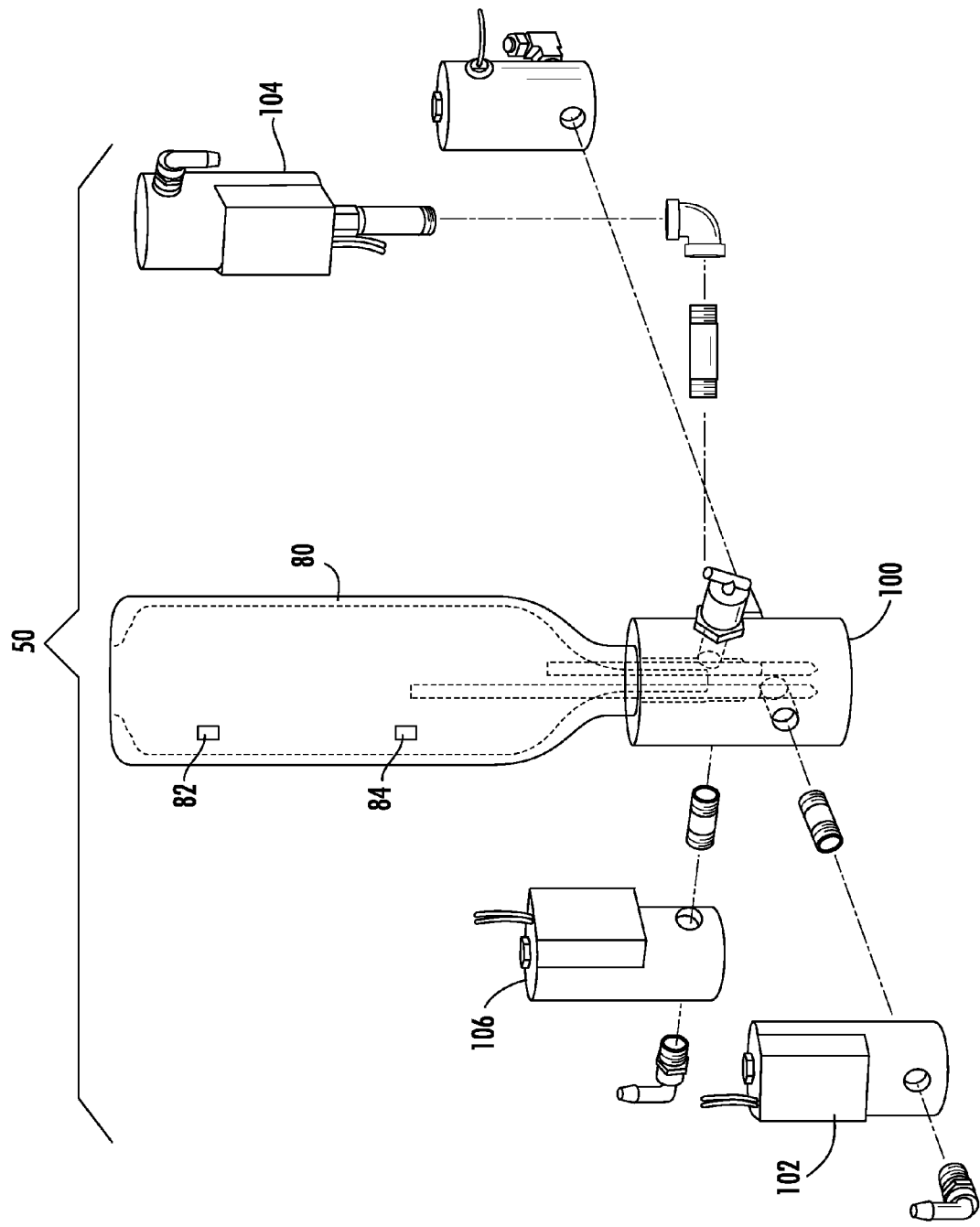

It has been taught as a key element of the present inventions that a pressure vessel assembly of a fixed volume be utilized for the absorption of carbon dioxide into the liquid for use in the manufacture of a sparkling type beverage. In the preferred embodiment, as shown in generally in FIG. 2 and in greater detail in conjunction with FIGS. 5a and 5b, the carbonation assembly 50 is shown having a carbonation chamber 80 shown in its preferred embodiment comprising a 16 oz. canister manufactured sufficiently to retain pressurized fluid in a safe manner. One particular feature and improvement of the present teachings include the function of the carbonation chamber 80 as a 'dose carbonator'. For purposes of the present invention a 'dose carbonator' refers to a controlled volume in which temperature, pressure, water volume, and, ultimately, $CO_2$ absorption can be performed and controlled. As such, the internal volume is designed to hold a dosed liquid volume, plus an additional head space to allow for addition of pressurized carbon dioxide, as described generally herein and in greater detail below. It is anticipated that the total internal volume less the volume of the head space is equal to 14 fluid ounces for dispensing a 16 ounce beverage. In this manner, flavorings, essences and syrups are blended in a fixed proportion of 2 ounces flavoring to 14 ounces of chilled (or carbonated) water. Further, it is anticipated that within the teachings of the present invention alternate internal volumes can be provided such as to provide for different size beverages, or alternation between different sized beverages. In the present embodiment, the use of a capacitance sensors 82, 84 located along the vertical sidewall of the carbonation chamber 80 can be used to identify and control filling to a desired level, with the upper capacitance sensor 82 located at a level corresponding to the volume associated with the proportions identified above for a larger mixed beverage (i.e., 16 total ounces of consumable beverage), while the lower capacitance sensor 84 is located at a level corresponding to a different size, anticipated herein as being at a level indicating the introduction of 7 fluid ounces of liquid for allowing for the dispensing a finished beverage of 8 ounces. It is anticipated that a person having ordinary skill in the relevant art, in light of the teachings and goals of the present invention, would envision as an alternate design choice variations in the number of level sensors or corresponding volumes of finished beverages as functionally equivalent design alternatives or obvious extensions of the teachings herein, or both.

The use of the type and style of chamber 80 as shown has been found to have benefits in use. The continuous vessel volume with minimal penetrations minimizes unwanted leaks of liquids or gases. The single entry orifice can be sealed with O-ring seals, and may allow the $CO_2$ injection into the chamber 80 to be done through an entry tube 86 that terminates below the anticipated liquid level, thereby allowing for the $CO_2$ to be bubbled through the liquid on its way into the chamber. However, the $CO_2$ will eventually collect at the apex of the chamber, and as such a continuous vessel volume therefore results in the minimizing of the surface area of the liquid-gas interface, thereby decreasing the effective and rapid mixing and absorption of carbon dioxide. Improved carbonation methods, as described herein below, have been therefore developed in order to minimize the mixing or dwell time required to get desired or complete carbonation.

Other challenges of such a chamber 80 design is the use of metal forming results in limited options for level detection. While contact sensor can, of course, be implemented by incorporating additional orifices into the chamber sidewall, non-contact sensors and capacitive type sensors are of limited use with such a design. Further still, the thermal conductivity of a metal sidewall increases the heat flux into the liquid contents, thereby warming the resulting cold beverage. As such, as an alternate embodiment for a carbonation chamber 80 the use of a blow molded plastic materials having lower thermal capacities may be used to minimize the absorption of heat into the liquid contents during the carbonation cycle.

In either embodiment it is anticipated that the temperature of the internal fluid contents of the carbonation chamber 80 can be obtained to or maintained at 37° F. with the introduction into the pitcher assembly 18 of chilled water at or below this temperature; it is further anticipated that the pressure of the internal volume can, and should, be maintained at between 125 to 150 psi. This provides an optimum condition for absorption of $CO_2$ into the water.

3. Detailed Description of the Carbonation Methods

In order to obtain a pressure of between 125 to 150 psi, a cylinder 60 of high pressure $CO_2$ is in fluid communication with the internal volume of the carbonation chamber 80 through the $CO_2$ inlet of the junction block 100. The junction block 100 functions as the manifold for fluid flow of liquid and pressurized gas as directed by the $CO_2$ solenoid 102, the vent solenoid 104, or liquid supply pump 106 that are each in fluid communication with their respective systems. A pressure transducer 110 controls the introduction of the 1800 psi working pressure of $CO_2$ from the cylinder 60 to the $CO_2$ inlet. As identified previously in the RELATED APPLICATIONS, in order to provide consistent, available, and economical source of $CO_2$, it is anticipated that the beverage machine 10 of the present invention would take advantages of an existing source of such compressed carbonating gas such as a common $CO_2$ gas propellant as are found for use in powering paintball guns, which typically comes in the three sizes of 9 oz, 12 oz and the 20 oz. It is anticipated that a person having ordinary skill in the relevant art, in light of the teachings and goals of the present invention, would envision any of these sizes as functionally equivalent design alternatives or obvious extensions of the teachings herein, or both.

In order to optimize the absorption of the fixed dose of carbonated water, it is anticipated that the head space should be vented of any residual air and filled with $CO_2$. This can be done by driving $CO_2$ through a discharge straw 120 and out through the vent valve 106. It is further anticipated that a pulsed introduction of $CO_2$ into the $CO_2$ inlet would allow for improved incremental carbonation of the water until an optimum pressure of between 125 to 150 psi is obtained within the volume and maintained by the vent valve 106.

Figure 6:
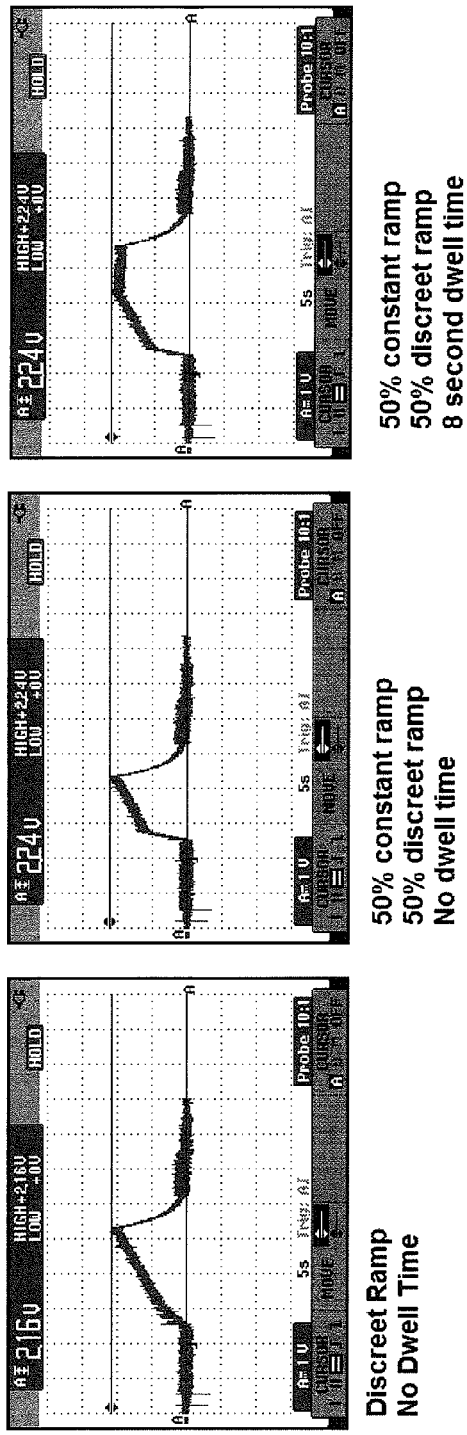
FIG. 6 is a graph showing the operation of the control solenoid for controlling the flow of $CO_2$ to the chamber 80 with the resulting pressure profile according to the preferred operation of the present invention.
Figure 6:
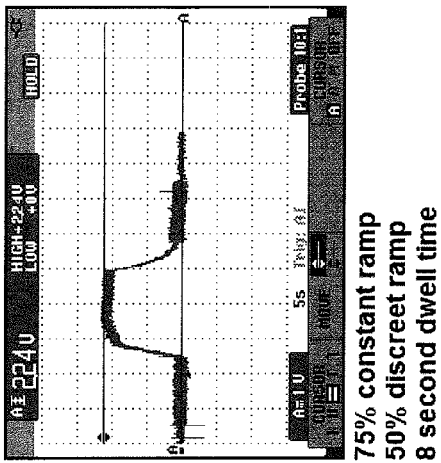
Figure 6:
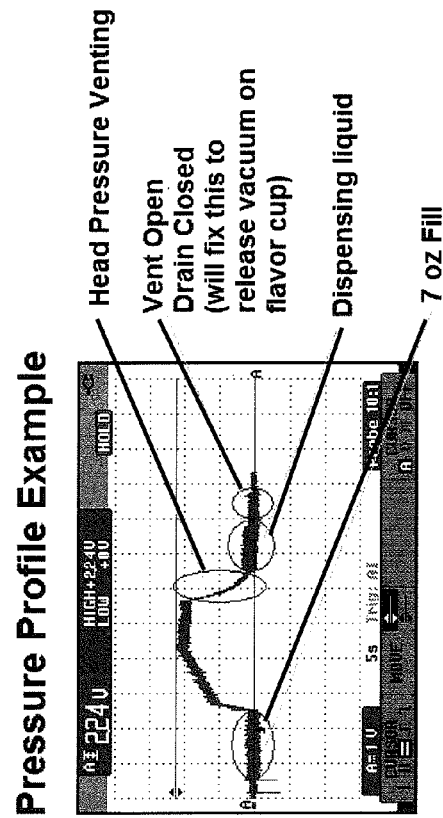

Referring in conjunction to FIG. 6, the operation of the control solenoid for controlling the flow of $CO_2$ to the chamber 80 is described and shown with the resulting pressure profile. It has been found through significant testing that the introductions of pressurized $CO_2$ in a batched, ramped fashion would require a significant dwell time to allow for adequate carbonation of the contents. Alternately, the use of pulsed charges of $CO_2$ has been found to be more effective at urging absorption into the liquid, but only at higher pressures. In addition, the use of a continuous pulsed introduction of $CO_2$ would result in a long cycle time, to be found unacceptably long to the consumer in addition to allowing additional time for warming of the beverage through heat soaking. It has been found to be an optimum cycle to provide an initial pressurization of the carbonation chamber (as shown by slope A), followed by pulsing the $CO_2$ into the vessel pressure until it maintains a constant maximum pressure (As shown by slope B), allows for greater absorption into the liquid at an acceptable overall cycle time. Once fully charged, an optimal dwell time of about approximately 8 seconds (as shown by slope C) has been shown to provide an optimal overall cycle and dwell time to attain adequate carbonation at a reasonable overall cycle type. This pressure is then vented (as shown in slope D) prior to dispensing of the liquid (as shown in slope E). Additionally, the venting of the carbonation chamber 80 during liquid discharge has also been found useful in releasing any vacuum created by dispensing of the mixed beverage, as will be described in greater detail below.

4. Detailed Description of Syrup Interaction or Control

Figure 7:
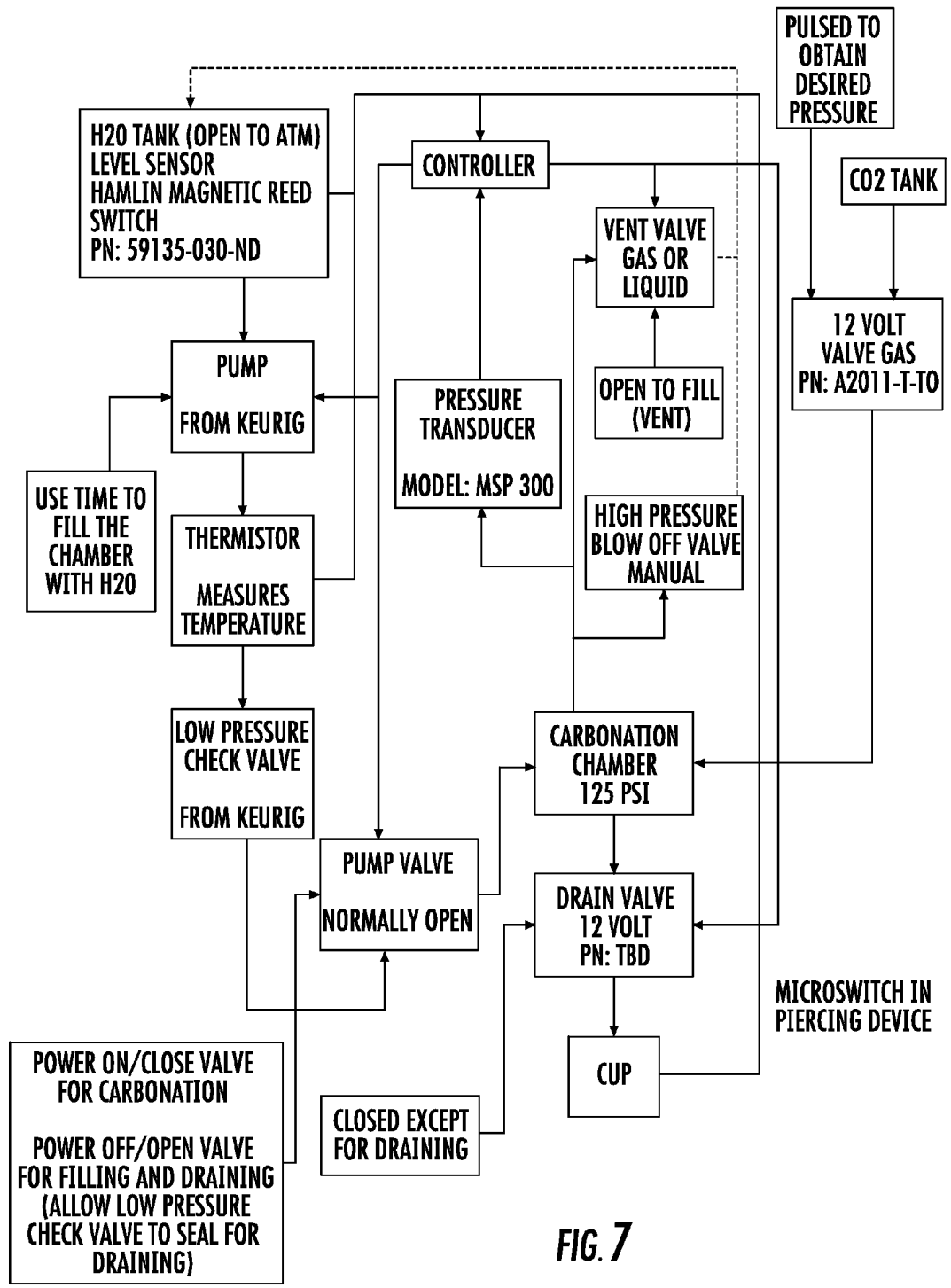
FIG. 7 is an operational flow chart of an in-situ counter top beverage maker for carbonated and uncarbonated beverages according to the preferred embodiment of the present invention.

Operation of the present invention is best described in conjunction with FIG. 7 in which an in-situ counter top beverage maker for carbonated and uncarbonated beverages according to the preferred embodiment of the present invention. The level sensor within the fluid reservoir identifies the presence of a sufficient amount of liquid from which to form a mixed beverage. If present, upon initiation the pump will operate for a predetermined cycle period for providing the carbonation chamber with sufficient liquid (either 7 ounces or 14 ounces) depending upon the size beverage selected. A thermistor measures temperature of the fluid portion and may be used to control the amount of $CO_2$ pressure needed for saturation. If sufficient $CO_2$ pressure exists in the canister 60 then the pump is powered and the vent valve opened to allow for filling of the canister with fluid. Once full, the carbonation chamber is pressurized in the manner described above to allow the pressurized canister to pressurize the carbonation chamber up to the appropriate saturation pressure (approximately 125 to 150 psi). A pressure transducer may be used in fluid communication with the carbonation chamber through the junction block 100. If the carbonation chamber experiences a pressure above the desired target pressure, a high pressure relieve valve may then release gas until the excess pressure is relieved.

In conjunction with the preferred embodiment of the present invention, the beverage maker 10 incorporates the Central Processing Unit for operationally controlling all of the internal controls. When the beverage maker 10 is activated, a user interface displaced on the operational control unit 24 will indicate status, cycle step and operation by use of illuminated LED driven directly from the internal power supply.

However, unlike brewed beverages such as coffee or tea where users are accustomed to variation in output and routinely control concentration through steeping time, level of grind of the beans, or sheer quantity of ground beans, in carbonated or non-carbonated beverages the consumer expectation is one of greater consistency. Further, with the use of a fixed volume 'dose carbonator' a greater need exists for verification and authentication of the type, quality, quantity, concentration, etc. of the flavor concentrate or non-diluent component. In the present invention, the use of individually packed, single use disposable flavor cups 200 is anticipated which include a mixing area 200a of a volume greater than the volume that will be filled with the flavors of choice to make sparkling flavored water and a syrup to make vitamin fortified and mineral added, low sugar soda pop. Additionally, a coded authentication mechanism is anticipated as being carried by the cup 200, and identified by the beverage maker 10, would allow the settings of the beverage maker 10 to be pre-set to accommodate normal condition anticipated for use with a particular beverage. By way of examples, the beverage size could be selected from an 8 oz beverage or a 16 oz beverage; the beverage could be a sparkling orange drink, or a non-sparkling herbal water. Since such a great number of permutations exist, the use of coding the system defaults within the flavor cup 200, and then identified by and used to adjust the settings of the beverage maker can eliminate many errant selections. Additionally, by merely identifying and selecting default settings, the machine 10 will still allow for the user to confirm or modify them prior to operation. In this manner, the user can still create a carbonated herbal beverage, or a non carbonate cola, for example, as well as increasing or decreasing the amount of carbonation desired.

In order to accomplish the validation and verification of a properly provided flavor cup 200, the coded authentication mechanism formed of an RFID tag (or transponder device) of a commonly available type utilized to store and remotely retrieving data. An RFID tag is applied to or incorporated into flavor cup 200, preferably within the cup's closure lid, and carries with in a variety of validating or authenticating information, including, but no limited to: authorization code or codes; flavor cup content information such as, for example, source, date expiration, flavor, and the like; and, default beverage selection data for purposes of presenting the beverage maker's default settings. Most RFID systems contain at least two parts: an integrated circuit to store and process information, to modulate and demodulate a (RF) signal, and to perform other specialized functions; and, an antenna to receive and transmit the signal. Chipless RFID technology allows for discrete identification of tags without integrated circuit, and these tags can be printed directly onto the flavor cup 200 or its foil cover at a lower cost than traditional ones. Such passive tags require no internal power source and are only active when a nearby-reader powers them. It is anticipated that the RFID reader with antenna is incorporated with the beverage maker 10 and in electronic communication with the Central Processing Unit in order to allow for retrieval of information from the RFID tag and implementation of system default settings in response to the retrieved information. These default settings are anticipated as including: authentication or verification of operation such as, for example, a "go"/"no-go" setting; beverage volume; carbonation or non-carbonation; level of carbonation; and the like. This ability to interact the flavor cup 200 directly with the control and operation of the beverage maker 10 allows the settings of the beverage maker 10 to be pre-set to accommodate normal condition anticipated for use with a particular beverage. This ability to pre-set defaults is just one additional feature that allows the beverage maker 10 to provide a quality, consistent and repeatable beverage, even when used with the wide range of varieties of cold sparkling or non-sparkling beverages that are anticipated as being prepared, as well as to accommodate the development of ever changing new beverage selections.

5. Detailed Description of the Piercing Mechanism

Figure 8A:
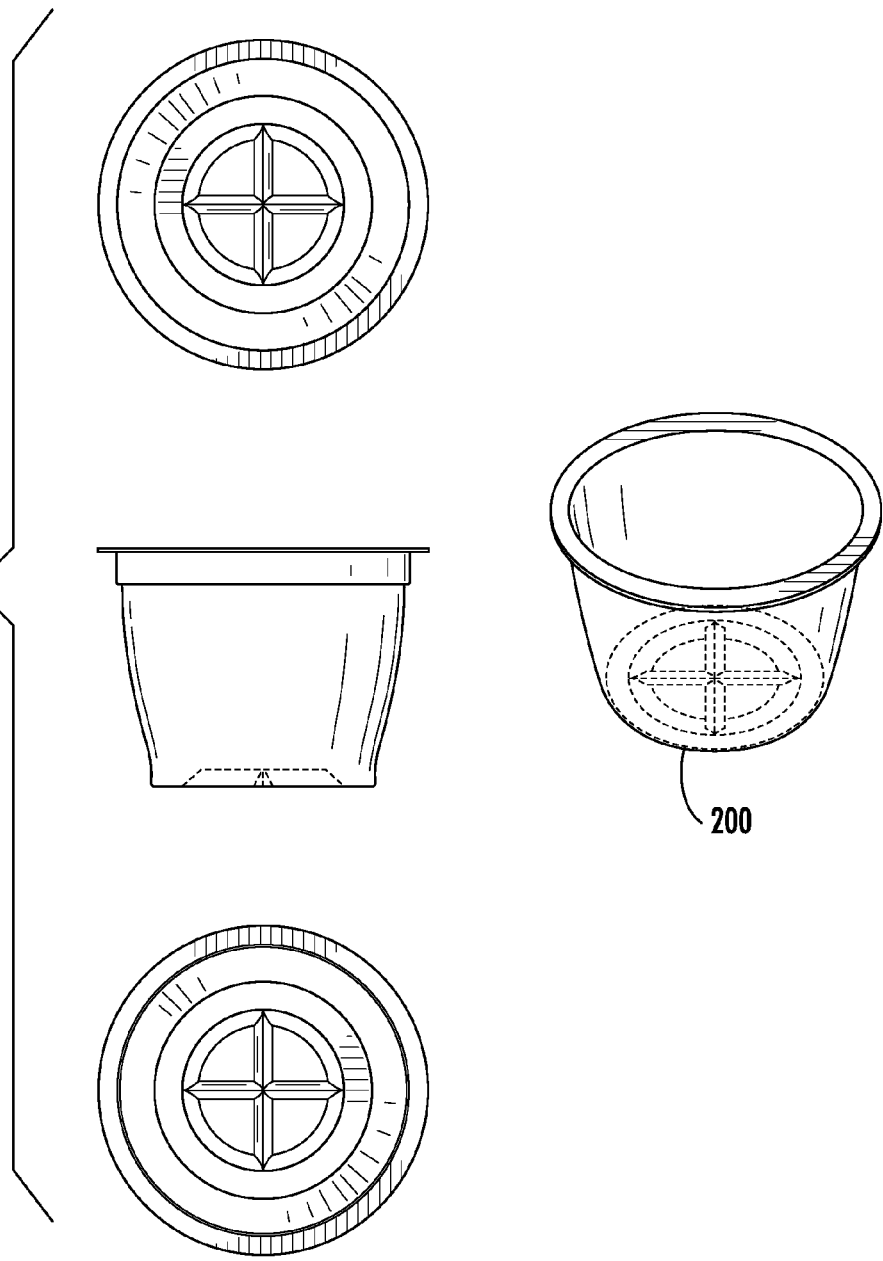
FIG. 8a and FIG. 8b are a perspective views of a small flavor cup 200 and large flavor cup 201, respectively, for use in conjunction with a beverage maker of the preferred embodiment.
Figure 8B:
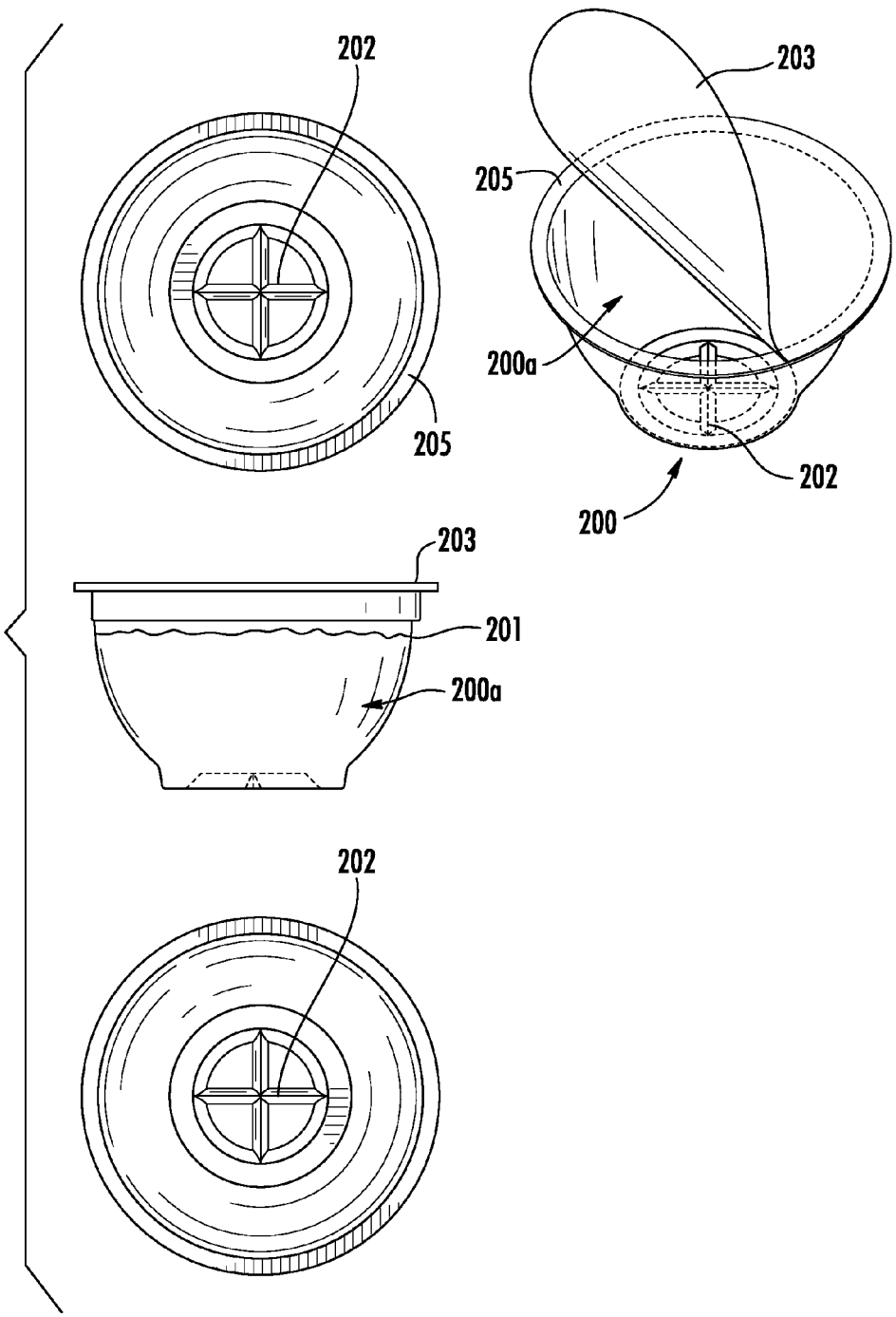
Figure 9:
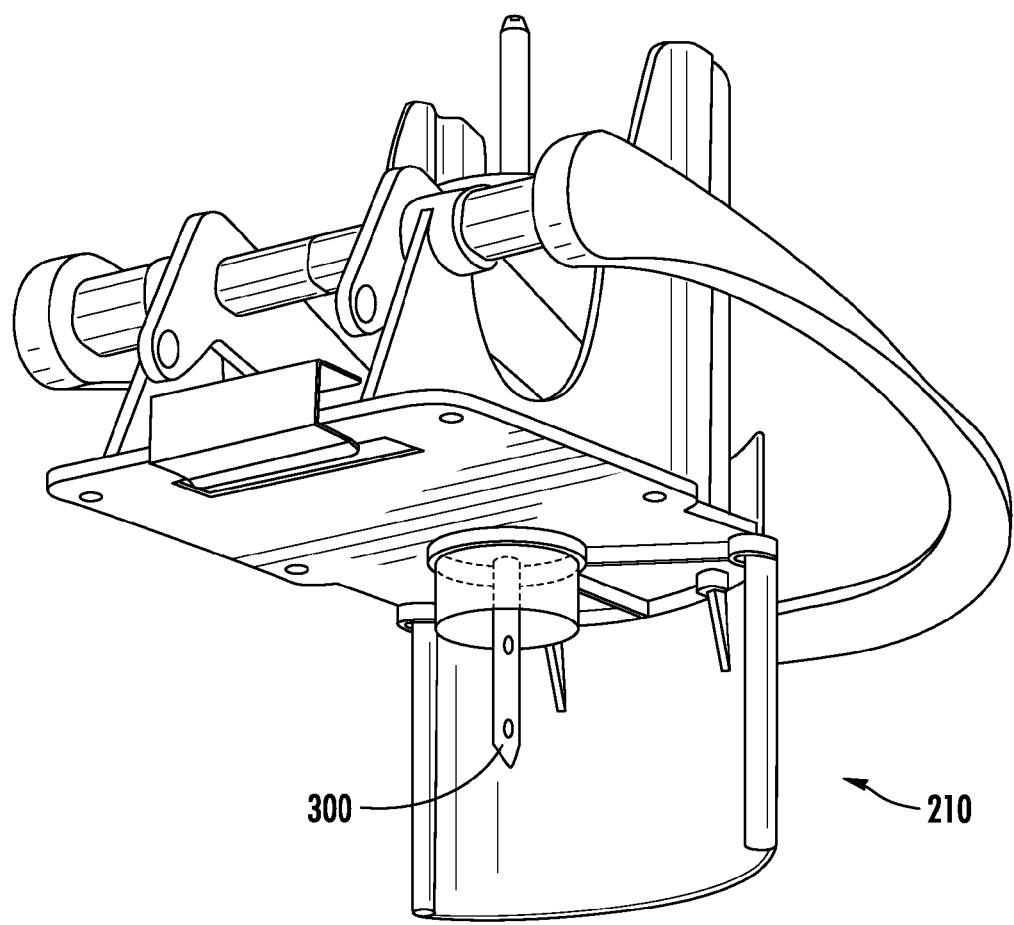
FIG. 9 is a perspective view of a piercing mechanism 210 for use in conjunction with a beverage maker 10 of the preferred embodiment.

Referring now to FIGS. 8a and 8b, the flavor cup is shown in two embodiments, one having a capacity of slightly more than 1 oz., but will be filled with 1 oz. syrup flavor concentrate, as noted as 200 and the second one having a capacity of slightly more than 2 oz., but will be filled with 2 oz. syrup flavor concentrate and noted as 201. Each cup 200 functions similarly in conjunction with the piercing mechanism 210 shown best in conjunction with FIG. 9. A custom vacuum formed design incorporates a indexing ridge 202, and a sealed foil cover 203 covers and seals the flavor cup 200. When placed in the mixing chamber 125, the foil 203 is pierced on the top and, in doing so, will allow the cup to move downward and be pierced a second time from the bottom. An upper peripheral flange 205 therein support the cup. When the piercing needle approaches from the top of the cup, it will be engaged and sealed about its perimeter by the foil and around the piercing cite.

Figure 10A:
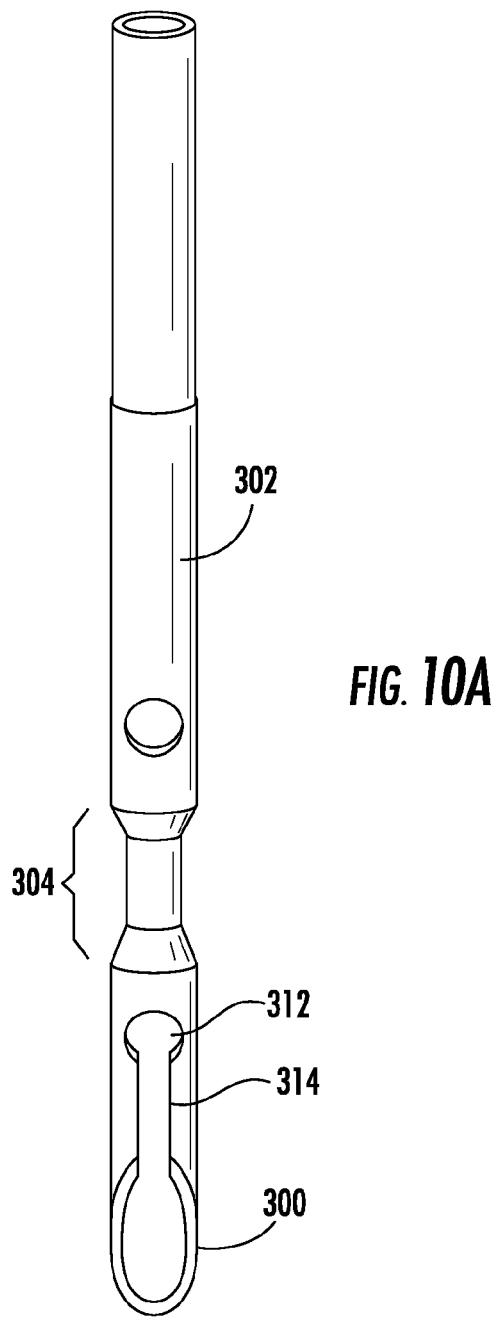
FIG. 10a is a perspective view of a piercing needle 300 for use in conjunction with the piercing mechanism shown in FIG. 9.
Figure 10B:
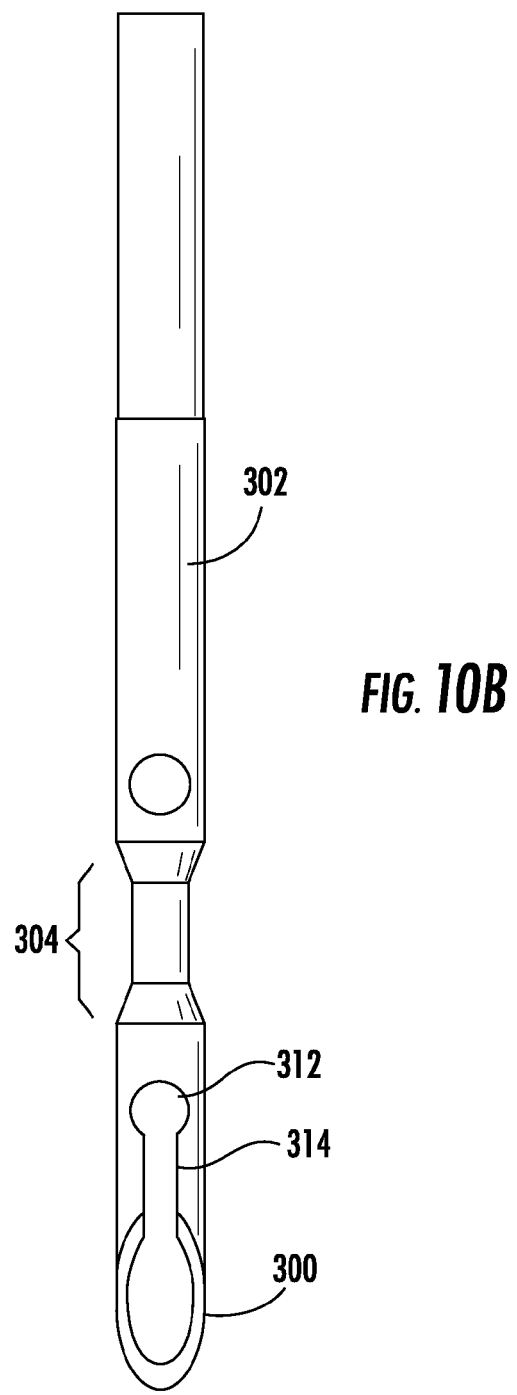
FIG. 10b is a top plan view thereof.
Figure 10C:
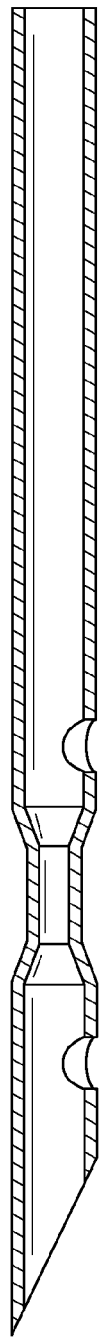
FIG. 10c is a cross sectional view taken along line X-X of FIG. 10b.

As shown in greater detail in FIG. 10a-10c, the piercing needle 300 is shown with the features and functions that allow the flavor cup 200 to adequately function as a mixing chamber for carbonated or noncarbonated chilled water and flavor syrup. The needle 300 forms an upper shank 302 separated by a lower blade 304 by a narrowed constrictive section 302. An upper vent hole 310 is formed in the upper shank 302. A lower vent hole 312 is formed in the lower blade section and in connected by a slot 314 to a discharge orifice 320 terminating at the lower blade 304. The unique design for the piercing needle 300 provides the optimum mixing of carbonated or not carbonated water with the flavor syrup contained with the individually packed, single use disposable flavor cups 200.

The cups 200 are anticipated as including a mixing area 200a of a volume greater than the volume that will be filled with the flavors of choice to make sparkling flavored water and a syrup to make vitamin fortified and mineral added, low sugar soda pop. The foil cover 203 is pierced on the top by the needle 300; the needle 300 is subsequently urged downward to further pierce the bottom of the cup 200. When the piercing needle is driven down through the top of the cup, it will be engaged and sealed about its perimeter by the foil and around the piercing site, with the upper hole 310 forming an exit orifice from the shaft of the needle 300 into the cup. The constriction 304 formed below the upper hole 310 provides hydraulic resistance to fluid being discharged through the needle 310 and therein causes the discharged fluid to want to flow though the upper hole 310 and not down past through the constriction 304. This will cause the discharged liquid, carbonated or uncarbonated, to discharge into the volume of the flavor cup 200 in a swirling fashion, thereafter allowing the cup 200 to function as a mixing chamber between carbonated or noncarbonated chilled water and the flavor syrup contents. This blended fluid is then allowed to drain down the lower orifice 312 and discharged into a waiting receiving vessels such as a cup or mug.

As described above, a preferred embodiment, as anticipated at the time of filing, is identified and described as exemplary of the teachings of the present invention. However, the disclosure is not intended to be narrowly construed by this exemplary embodiment, as one skilled in the art would know that the operational and functional equivalent of many of the components, systems, steps and processes taught herein could be modified or replaced by equivalent components, systems, steps and processes and still remain within the spirit and teachings of the present invention.

The present invention provides improvements to a novel means to make a customized single-serving of chilled, sparkling beverage at home. A complete line of home, office and commercial appliances will have the basic attributes of a Sparkling Beverage Maker that will:

Give the consumer the ability to make on demand his/her choice of beverage in a single-service glass either a sparkling water with or without flavor, a sparkling fruit juice or an enhance soft drink, low in sugar with vitamins and minerals.

Give the consumer to ability to regulate and control the beverage temperature.

Give the consumer the ability to regulate the level of carbonation from low, medium and high.

Give the consumer the ability to choose and regulate the flavor of sparkling water as the dispensing takes place for a continual and immediate freshness.

Gives the consumer the ability to switch over to making a sparkling fruit juice.

Gives the consumer the ability to switch over to making a healthy soda pop.

Gives the consumer the luxury of benefiting from these single-serving glasses, on-demand, at a push of a button freshness, eliminating waste due to loss of carbonation going flat at a fraction of the cost of store-bought beverages.

The foregoing descriptions of specific embodiments of the present invention have been presented for the purposes of illustration and description. They are neither intended to be exhaustive nor to limit the invention to the precise forms disclosed and, obviously, many modifications and variations are possible in light of the above teaching. The embodiments were chosen and described in order to best explain the principles of the invention and its practical application, to thereby enable others skilled in the art to best utilize the invention and the various embodiments with various modifications as are suited to the particular use contemplated. It is intended that the scope of the invention be defined by the Claims appended hereto and their equivalents. Therefore, the scope of the invention is to be limited only by the following claims.

The invention claimed is:

1. A beverage maker capable of making customized beverages, said beverage maker comprises:
   a compact housing;
   a water source in fluid communication with a carbonation chamber configured to mix a selected volume of water with carbon dioxide to form a selected volume of carbonated water; a carbon dioxide source in fluid communication with said carbonation chamber, wherein said carbonation chamber defines a pressure vessel of a fixed volume utilized for carbon dioxide absorption into said selected volume of water, wherein said carbonation chamber defines a controlled volume such that the carbon dioxide absorption can be performed and controlled;
   a single use disposable flavor cup containing a flavor and having a sealed cover that covers and seals said flavor cup;
   a water injection nozzle configured to access said flavor cup and operatively charge said flavor cup with said selected volume of carbonated water so as to mix the selected volume of carbonated water with the flavor to form a flavored beverage, wherein said water injection nozzle defines:
      an upper shank separated from a lower blade by a narrowed constrictive section;
      an upper vent hole formed in the upper shank; and
      a lower vent hole formed in the lower blade section; and
   a discharge port configured to dispense the flavored beverage, wherein the lower vent is connected by a slot to the discharge port,
   wherein the water injection nozzle is further configured to pierce a bottom of the flavor cup such that the upper vent hole is aligned with an interior volume of the flavor cup and the lower vent hole is positioned below the bottom of the flavor cup.

2. The beverage maker of claim 1 further comprising a central processing unit that operationally controls said beverage maker, wherein the central processing unit is configured to operatively interact with the flavor cup.

3. The beverage maker of claim 2, wherein said flavor cup further comprises a coded authentication mechanism capable of being identified by said central processing unit of the beverage maker.

4. The beverage maker of claim 3, wherein the central processing unit is configured to identify said coded authentication mechanism and, in response, operate the beverage maker according to pre-set conditions based on the identified coded authentication mechanism.

5. The beverage maker of claim 4, wherein said preset conditions are selected from the group comprising: overall beverage size; activation of carbonation; level of carbonation; verification of expiration of use; and validation of authorized source.

6. The beverage maker of claim 3 further comprising an RFID reader in operative communication with said central processing unit, wherein said coded authentication mechanism comprises an RFID tag or transponder device utilized to store and remotely retrieve data, said RFID tag applied to or incorporated into said flavor cup, wherein the RFID reader is configured to retrieve information from the RFID tag, and wherein the central processing unit is configured to operate the beverage maker based on the information retrieved from the RFID tag.

7. The beverage maker of claim 1, wherein said carbonation chamber forms an internal volume designed to hold a selected liquid volume, plus an additional head space, wherein said internal volume is of a predetermined and fixed proportion to a second volume corresponding to the flavor within said flavor cup.

8. The beverage maker of claim 7, wherein said carbon dioxide source is operatively interactive with said carbonation chamber such as to allow a pressure of between 125 to 150 psi to be created for the carbonation of the selected volume within said carbonation chamber.

9. The beverage maker of claim 1, wherein said flavor cup defines:
   a mixing area of a volume greater than the volume of the flavor;
   a vacuum formed sidewall incorporating an indexing ridge; and
   an upper peripheral flange; and wherein the sealed cover defines a sealed foil cover attached to said flange for covering and sealing said flavor cup.

10. The beverage maker of claim 9, wherein said flavor cup functions as a mixing chamber for carbonated or noncarbonated chilled water and flavor syrup.

11. The beverage maker of claim 1, wherein the flow of carbon dioxide is controlled by pulsing said carbon dioxide into said carbonation chamber.

12. The beverage maker of claim 1, wherein said flavor cup is configured to function as a mixing chamber for the flavor and the selected volume of carbonated water when the covered seal is penetrated by said water injection nozzle.

13. The beverage maker of claim 1, wherein said flavor cup defines a vacuum formed design incorporating an indexing ridge, wherein said sealed cover of the flavor cup is pierced on the top by the water injection nozzle when the flavor cup is placed in the beverage maker so as to cause the flavor cup to move downward and be pierced a second time from the bottom; wherein the water injection nozzle engages said sealed cover about its perimeter to form a seal for the flavor cup.

14. The beverage maker of claim 1, wherein said beverage maker further comprises an overall outer housing for containing the working components having an overall height of less than 15.5 inches, and an overall width of less than 14 inches wide, and an overall depth of 12.75 inches deep.

15. A beverage maker capable of making customized beverages in a single-serving, said beverage maker comprising:
   a compact housing;
   a reservoir in fluid communication with a carbonation chamber configured to mix a selected volume of water with carbon dioxide to form a selected volume of carbonated water;
   a pressurized carbon dioxide source in fluid communication with the carbonation chamber;
   a single use disposable flavor cup containing a flavor and having a sealed cover that covers and seals the flavor cup; and
   a piercing mechanism configured to pierce the flavor cup to mix the selected volume of carbonated water therein to form a flavored beverage, and wherein the piercing mechanism is configured to discharge the flavored beverage, wherein the piercing mechanism comprises:
      an upper shank separated from a lower blade by a narrowed constrictive section;
      an upper vent hole formed in the upper shank;
      a lower vent hole formed in the lower blade and connected by a slot to a discharge orifice terminating at the lower blade,
   wherein the carbonation chamber defines a pressure vessel of a fixed volume such that carbon dioxide absorption can be performed and controlled,
   wherein the piercing mechanism is further configured to pierce a bottom of the flavor cup such that the upper vent hole is aligned with an interior volume of the flavor cup and the lower vent hole is positioned below the bottom of the flavor cup.

16. The beverage maker of claim 15, wherein a control solenoid controls a flow of carbon dioxide to the carbonation chamber to create an initial pressurization of the carbonization chamber.

17. The beverage maker of claim 16, wherein the control solenoid further controls an additional flow of carbon dioxide to the carbonation chamber by pulsing the carbon dioxide into the carbonation chamber.

18. The beverage maker of claim 17, wherein the control solenoid pulses the carbon dioxide into the carbonation chamber until it maintains a constant maximum pressure.

19. The beverage maker of claim 15, wherein a pressure of between 125 to 150 psi is created for the carbonation of fluid within the carbonation chamber.

20. The beverage maker of claim 15, wherein said beverage maker further comprises an overall outer housing for containing the working components having an overall height of less than 15.5 inches, and an overall width of less than 14 inches wide, and an overall depth of 12.75 inches deep.

21. A beverage maker capable of making customized beverages in a single-serving, said beverage maker comprising:
   a reservoir in fluid communication with a carbonation chamber configured to mix a selected volume of water with carbon dioxide to form a selected volume of carbonated water;
   a pressurized carbon dioxide source in fluid communication with the carbonation chamber;
   a single use disposable flavor cup containing a flavor and having a sealed cover that covers and seals the flavor cup;
   a piercing mechanism configured to pierce the flavor cup to mix the selected volume of carbonated water therein to form a flavored beverage, and wherein the piercing mechanism is configured to discharge the flavored beverage;
      wherein the piercing mechanism comprises:
         an upper shank separated from a lower blade by a narrowed constrictive section;
         an upper vent hole formed in the upper shank;
         a lower vent hole formed in the lower blade and connected by a slot to a discharge orifice terminating at the lower blade; and a central processing unit configured to control operation of the beverage maker, wherein the central processing unit is configured to interact with the flavor cup to operate the beverage maker to make the flavored beverage, wherein the piercing mechanism is further configured to pierce a bottom of the flavor cup such that the upper vent hole is aligned with an interior volume of the flavor cup and the lower vent hole is positioned below the bottom of the flavor cup.

22. The beverage maker of claim 21, wherein the flavor cup further comprises a coded authentication mechanism configured to be identified by the central processing unit of the beverage maker.

23. The beverage maker of claim 22, wherein the central processing unit is configured to identify the coded authentication mechanism and, in response, operate the beverage maker according to pre-set conditions based on the identified coded authentication mechanism.

24. The beverage maker of claim 23, wherein the pre-set conditions comprise at least one of:
  overall beverage size;
  activation of carbonation;
  level of carbonation;
  verification of expiration of use; and
  validation of authorized source.

25. The beverage maker of claim 21, wherein the coded authentication mechanism comprises an RFID tag or transponder device.

26. The beverage maker of claim 25, wherein the RFID tag is configured to be applied to or incorporated into the flavor cup, and further comprising an RFID reader configured to be incorporated into the beverage maker and to be in electronic communication with the central processing unit to allow for retrieval of information from the RFID tag and implementation of default settings in response to the retrieved information.

27. A beverage maker capable of making customized beverages in a single-serving, said beverage maker comprising:
  a reservoir in fluid communication with a carbonation chamber configured to mix a selected volume of water with carbon dioxide to form a selected volume of carbonated water;
  a pressurized carbon dioxide source in fluid communication with the carbonation chamber;
  a single use disposable flavor cup containing a flavor and having a sealed cover that covers and seals the flavor cup; and
  a piercing mechanism configured to pierce the flavor cup to mix the selected volume of carbonated water therein to form a flavored beverage, and wherein the piercing mechanism is configured to discharge the flavored beverage,
  wherein the piercing mechanism comprises:
    an upper shank separated from a lower blade by a narrowed constrictive section;
    an upper vent hole formed in the upper shank;
    a lower vent hole formed in the lower blade and connected by a slot to a discharge orifice terminating at the lower blade,
  wherein the piercing mechanism is further configured to pierce a bottom of the flavor cup such that the upper vent hole is aligned with an interior volume of the flavor cup and the lower vent hole is positioned below the bottom of the flavor cup.

28. The beverage maker of claim 27, wherein the flavor cup comprises a vacuum formed design incorporating an indexing ridge, and wherein the piercing mechanism is configured to pierce the top of the sealed cover and urge the flavor cup downward to further pierce the bottom of the flavor cup.

29. The beverage maker of claim 27, wherein when the piercing mechanism pierces the foil cover, the piercing mechanism is configured such that the upper vent hole forms an exit orifice and the narrowed constrictive section provides hydraulic resistance to fluid being discharged through the piercing mechanism, therein causing carbonated fluid to flow though the upper vent hole into the flavor cup in a swirling fashion, thereafter allowing the cup to function as a mixing chamber between the carbonated fluid and the flavor, and wherein the piercing mechanism is further configured to allow the blended fluid to drain down the lower orifice and discharge into a receiving vessel.

30. The beverage maker according to claim 27, wherein the beverage maker is configured to operatively charge an interior volume of the flavor cup with the selected volume of carbonated water through the upper vent hole to mix the flavor and the selected volume of carbonated water to form the flavored beverage therein, and wherein the beverage maker is further configured to dispense the flavored beverage through the lower vent hole.

31. A method for making a customized beverage in a beverage maker, wherein the beverage maker comprises a compact housing, the method comprising:
  receiving a single use disposable flavor cup containing a flavor and having a sealed cover that covers and seals said flavor cup;
  providing a selected volume of water from a water source to a carbonation chamber, wherein the water source is in fluid communication with the carbonation chamber;
  providing carbon dioxide from a pressurized carbon dioxide source in a controlled manner to the selected volume of water in the carbonation chamber to form a selected volume of carbonated water, wherein the carbonation chamber defines a pressure vessel of a fixed volume utilized for absorption of carbon dioxide into the selected volume of water;
  projecting a water injection nozzle through the sealed cover of the flavor cup, wherein said water injection nozzle defines:
    an upper shank separated from a lower blade by a narrowed constrictive section;
    an upper vent hole formed in the upper shank; and
    a lower vent hole formed in the lower blade section and connected by a slot to a discharge port, wherein the water injection nozzle is configured to pierce a bottom of the flavor cup such that the upper vent hole is aligned with an interior volume of the flavor cup and the lower vent hole is positioned below the bottom of the flavor cup;
  operatively charging said flavor cup with the selected volume of carbonated water to mix the flavor and the selected volume of carbonated water therein to form a flavored beverage; and
  dispensing the flavored beverage from the discharge port.

32. A method for making a customized beverage in a beverage maker, the method comprising:
  receiving a single use disposable flavor cup containing a flavor and having a sealed cover that covers and seals said flavor cup; and
  operatively interacting, by a central processing unit, with the flavor cup, and in response, operating the beverage maker to make a flavored beverage by:

providing a selected volume of water from a water source to a carbonation chamber, wherein the water source is in fluid communication with the carbonation chamber;

providing carbon dioxide from a pressurized carbon dioxide source to the selected volume of water in the carbonation chamber to form a selected volume of carbonated water;

projecting a water injection nozzle through the sealed cover of the flavor cup;
  wherein the water injection nozzle comprises:
    an upper shank separated from a lower blade by a narrowed constrictive section;
    an upper vent hole formed in the upper shank; and
    a lower vent hole formed in the lower blade and connected by a slot to a discharge orifice terminating at the lower blade, wherein the water injection nozzle is configured to pierce a bottom of the flavor cup such that the upper vent hole is aligned with an interior volume of the flavor cup and the lower vent hole is positioned below the bottom of the flavor cup;

operatively charging said flavor cup with the selected volume of carbonated water to mix the flavor and the selected volume of carbonated water therein to form the flavored beverage; and dispensing the flavored beverage.

33. A method for making a customized beverage in a beverage maker, the method comprising:

receiving a single use disposable flavor cup containing a flavor and having a sealed cover that covers and seals said flavor cup;

providing a selected volume of water from a water source to a carbonation chamber, wherein the water source is in fluid communication with the carbonation chamber;

providing carbon dioxide from a pressurized carbon dioxide source to the selected volume of water in the carbonation chamber to form a selected volume of carbonated water;

projecting a piercing mechanism through the sealed cover of the flavor cup, wherein the piercing mechanism comprises:
  an upper shank separated from a lower blade by a narrowed constrictive section;
  an upper vent hole formed in the upper shank; and
  a lower vent hole formed in the lower blade and connected by a slot to a discharge orifice terminating at the lower blade, wherein the piercing mechanism is configured to pierce a bottom of the flavor cup such that the upper vent hole is aligned with an interior volume of the flavor cup and the lower vent hole is positioned below the bottom of the flavor cup;

operatively charging said flavor cup with the selected volume of carbonated water to mix the flavor and the selected volume of carbonated water therein to form a flavored beverage; and dispensing the flavored beverage.

* * * * *